「12」 United States Patent
Zeng

(10) Patent No.: US 11,403,197 B2
(45) Date of Patent: Aug. 2, 2022

(54) METHOD AND DEVICE FOR CONTROLLING APPLICATION, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 338 days.

(21) Appl. No.: 16/828,515

(22) Filed: Mar. 24, 2020

(65) Prior Publication Data

US 2020/0226433 A1 Jul. 16, 2020

Related U.S. Application Data

(63) Continuation of application No. PCT/CN2018/103254, filed on Aug. 30, 2018.

(30) Foreign Application Priority Data

Sep. 30, 2017 (CN) .......................... 201710940349.7

(51) Int. Cl.
*G06F 11/30* (2006.01)
*G06F 9/48* (2006.01)
*G06K 9/62* (2022.01)

(52) U.S. Cl.
CPC ............ *G06F 11/302* (2013.01); *G06F 9/485* (2013.01); *G06F 11/3075* (2013.01); *G06K 9/6256* (2013.01); *G06K 9/6278* (2013.01)

(58) Field of Classification Search
None
See application file for complete search history.

(56) References Cited

U.S. PATENT DOCUMENTS 6,473,084 B1 * 10/2002 Phillips .................. G06Q 40/04
 703/22
6,792,399 B1 * 9/2004 Phillips .................. G06Q 40/04
 705/37

(Continued)

FOREIGN PATENT DOCUMENTS

CN 102622510 A 8/2012
CN 104915779 A 9/2015

(Continued)

OTHER PUBLICATIONS

Indian Examination Report for IN Application 202017016440 dated Sep. 7, 2021. (6 pages).

(Continued)

*Primary Examiner* — Qing Chen
(74) *Attorney, Agent, or Firm* — Young Basile Hanlon & MacFarlane, P.C.

(57) ABSTRACT

A method and device for controlling an application, a storage medium, and an electronic device are provided. The method includes the following. For each of sampling time points in a historical period: an operation parameter of the electronic device corresponding to the sampling time point is obtained, where the operation parameter includes a foreground application, remaining electric quantity, screen-on duration, a charging connection state, and a network connection state; an attenuation parameter corresponding to the operation parameter is determined according to the sampling time point; at least one training sample is generated according to the sampling time point and the operation parameter. A predetermined Bayesian model is trained according to training samples generated and attenuation parameters determined. At least one background application of the electronic device is controlled according to the trained Bayesian model.

20 Claims, 6 Drawing Sheets

(56) References Cited

U.S. PATENT DOCUMENTS

| | | | |
|---|---|---|---|
| 7,072,863 B1 * | 7/2006 | Phillips | H04L 47/70 703/2 |
| 8,935,198 B1 * | 1/2015 | Phillips | G06Q 40/00 706/62 |
| 9,424,745 B1 | 8/2016 | Kagoshima et al. | |

FOREIGN PATENT DOCUMENTS

| | | | |
|---|---|---|---|
| CN | 105468823 A | 4/2016 | |
| CN | 106484077 A | 3/2017 | |
| CN | 106600369 A | 4/2017 | |
| CN | 106648023 A | 5/2017 | |
| CN | 106921700 A | 7/2017 | |
| CN | 107133094 A | 9/2017 | |
| WO | 2016191737 A2 | 12/2016 | |

OTHER PUBLICATIONS

2017Trustcom/BigDataSE/ICESS, pp. 776-783, HiNextApp: A Context Aware and Adaptive Framework for App Prediction in Mobile Systems, Chaoneng Xiang.

International search report issued in corresponding international application No. PCT/CN2018/103254 dated Dec. 3, 2018.

"UbiComp Proceedings of the 2012 ACM Conference on Ubiquitous Computing", pp. 173-182, "Understanding and Prediction of Mobile Application Usage for Smart Phones", Choonsung Shin etc.

"UbiComp Proceedings of the 2012 ACM Conference on Ubiquitous Computing", pp. 1059-1065, "Predicting mobiles application usage using contextual information", Ke Huang etc.

Yi-Fan Chung et al: "Enhancing user experiences by exploiting energy and launch delay trade-off of mobile multimedia applications", dated Mar. 21, 2013, pp. 1-19.

Young-Seol Lee et al: "An Efficient Energy Management System for Android Phone Using Bayesian Networks", dated Jun. 18, 2012, pp. 102-107.

Extended European search report issued in corresponding European application No. 18860046.4 dated Oct. 23, 2020.

* cited by examiner

METHOD AND DEVICE FOR CONTROLLING APPLICATION, STORAGE MEDIUM, AND ELECTRONIC DEVICE

CROSS-REFERENCE TO RELATED APPLICATION(S)

This application is a continuation of International Application No. PCT/CN2018/103254, filed on Aug. 30, 2018, which claims priority to Chinese Patent Application No. 201710940349.7, filed on Sep. 30, 2017, the disclosures of both of which are hereby incorporated by reference in their entireties.

TECHNICAL FIELD

This disclosure relates to the field of computer technology, and more particularly to a method and device for controlling an application, a storage medium, and an electronic device.

BACKGROUND

With the development of technology, mobile terminals such as smart phones, portable android devices (PAD), and the like have become indispensable devices in people's lives.

Currently, more and more applications are installed in terminals. When an application of a terminal is not needed by a user, in response to a user input, the terminal switches the application to the background, and may perform an operation such as switching a new application to the foreground, displaying a main interface, locking the terminal, or the like. These applications switched to the background are still running, for example, these applications continue to exchange data with a server, monitor users' operations, and so on. Running of these applications in the background still occupy system resources, such as occupy system memory, consume data traffic, and consume electric quantity of the terminal, and so on. In order to prevent the application not needed from occupying the system resources, some background applications need to be cleaned up. As an example, select background applications that occupy large memory from background applications according to the amount of memory occupied by respective background applications and clean up the applications selected. As another example, clean up low-priority applications among the background applications according to priorities of applications recorded in factory settings. However, these cleaning methods are relatively rigid and cannot flexibly determine which applications need to be cleaned up. Therefore, it is difficult to effectively improve system resource utilization.

SUMMARY

According to embodiments, a method for controlling an application is provided. The method is applicable to an electronic device and includes the following. For each of sampling time points in a historical period, an operation parameter of the electronic device corresponding to the sampling time point is obtained, where the operation parameter includes a foreground application, remaining electric quantity, screen-on duration, a charging connection state, and a network connection state. For each of the sampling time points in the historical period, an attenuation parameter corresponding to the operation parameter is determined according to the sampling time point. For each of the sampling time points in the historical period, at least one training sample is generated according to the sampling time point and the operation parameter. A predetermined Bayesian model is trained according to training samples generated and attenuation parameters determined. At least one background application of the electronic device is controlled according to the trained Bayesian model.

According to embodiments, a non-transitory computer-readable storage medium is provided. The non-transitory computer-readable storage medium is configured to store instructions. The instructions, when executed by a processor, cause the processor to execute part or all of the operations of any of the method for controlling an application.

According to embodiments, an electronic device is provided. The electronic device includes at least one processor and a computer readable storage. The computer readable storage is coupled to the at least one processor and stores at least one computer executable instruction thereon which, when executed by the at least one processor, is operable with the at least one processor to execute part or all of the operations of any of the method for controlling an application.

BRIEF DESCRIPTION OF DRAWINGS

Embodiments of the disclosure will be described in detail in combination with accompanying drawings such that technical solutions and advantages of the disclosure will be apparent.

DETAILED DESCRIPTION

Figure 1:
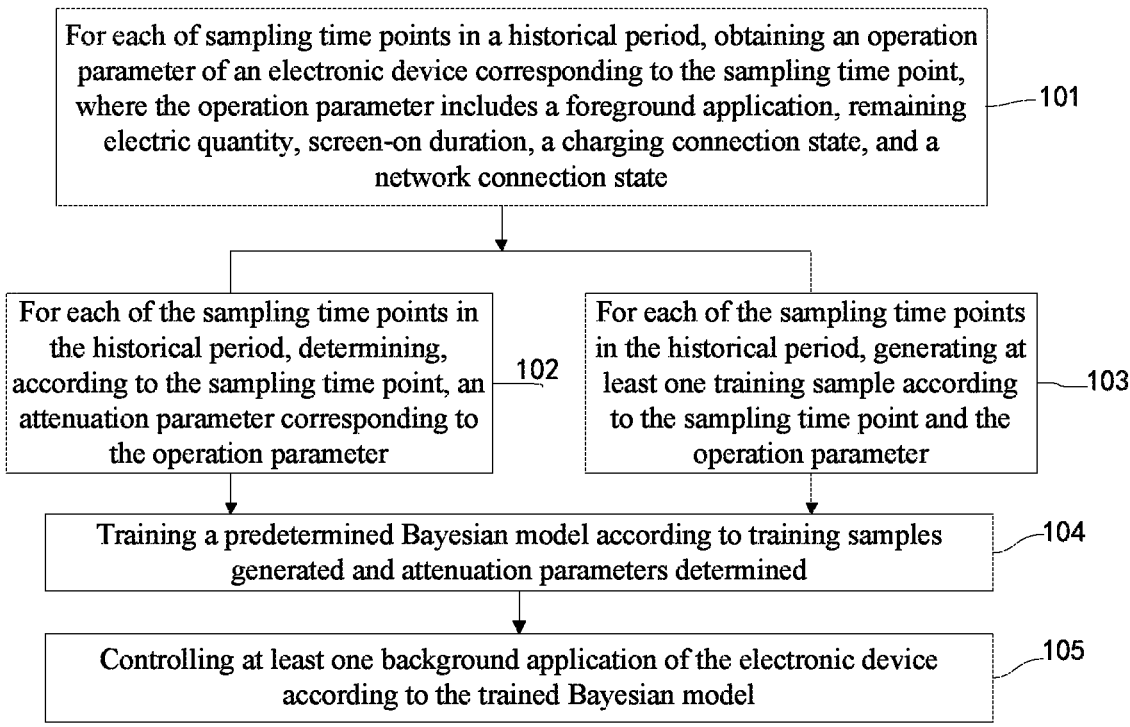
FIG. 1 is a schematic flow chart illustrating a method for controlling an application according to embodiments.

Hereinafter, technical solutions embodied by embodiments of the disclosure will be described in a clear and comprehensive manner with reference to the accompanying drawings intended for the embodiments. It is evident that the embodiments described herein constitute merely some rather than all the embodiments of the disclosure, and that those of ordinary skill in the art will be able to derive other embodiments based on these embodiments without making creative efforts, which all such derived embodiments shall all fall in the protection scope of the disclosure.

According to embodiments of the disclosure, a method and device for controlling an application, a storage medium, and an electronic device are provided.

A method for controlling an application is provided. The method includes the following. For each of sampling time points in a historical period, an operation parameter of the electronic device corresponding to the sampling time point is obtained, where the operation parameter includes a foreground application, remaining electric quantity, screen-on duration, a charging connection state, and a network connection state. For each of the sampling time points in the historical period, an attenuation parameter corresponding to the operation parameter is determined according to the sampling time point. For each of the sampling time points in the historical period, at least one training sample is generated according to the sampling time point and the operation parameter. A predetermined Bayesian model is trained according to training samples generated and attenuation parameters determined. At least one background application of the electronic device is controlled according to the trained Bayesian model.

In some embodiments, for each of the sampling time points in the historical period, the attenuation parameter corresponding to the operation parameter is determined according to the sampling time point as follows. A sampling date is extracted from the sampling time point. A distribution position of the sampling date from all distribution positions of the historical period is determined. The attenuation parameter corresponding to the operation parameter is obtained according to the distribution position.

In some embodiments, for each of the sampling time points in the historical period, the at least one training sample is generated according to the sampling time point and the operation parameter as follows. A sampling-date type and a sampling period are determined according to the sampling time point. A preset electric quantity range in which the remaining electric quantity falls is determined and a preset duration range in which the screen-on duration falls is determined. The at least one training sample is generated according to the sampling-date type, the sampling period, the preset electric quantity range, the preset duration range, the foreground application, the charging connection state, and the network connection state.

In some embodiments, the at least one training sample is generated according to the sampling-date type, the sampling period, the preset electric quantity range, the preset duration range, the foreground application, the charging connection state, and the network connection state as follows. At least one target prediction application is determined. A last switched application running before the foreground application and a next switched application running after the foreground application are determined according to the sampling time point from operation parameters obtained. For each of the at least one target prediction application, a prediction value for the target prediction application is determined according to the sampling time point, the next switched application, and the foreground application. For each of the at least one target prediction application, a training sample among the at least one training sample is generated according to the last switched application, the foreground application, the sampling-date type, the sampling period, the preset electric quantity range, the preset duration range, the charging connection state, the network connection state, the target prediction application, and the prediction value.

In some embodiments, for each of the at least one target prediction application, the prediction value for the target prediction application is determined according to the sampling time point, the next switched application, and the foreground application as follows. A difference between a sampling time point at which the next switched application is determined and the sampling time point at which the foreground application is determined is calculated. Whether the target prediction application is the next switched application and whether the difference fails to exceed preset time length are determined. Upon determining that the target prediction application is the next switched application and the difference fails to exceed the preset time length, a first preset value is set to be the prediction value for the target prediction application. Upon determining that the target prediction application is not the next switched application or the difference exceeds the preset time length, a second preset value is set to be the prediction value for the target prediction application.

In some embodiments, for each of the at least one target prediction application, a training sample among the at least one training sample is generated according to the last switched application, the foreground application, the sampling-date type, the sampling period, the preset electric quantity range, the preset duration range, the charging connection state, the network connection state, the target prediction application, and the prediction value as follows. Feature values corresponding to the last switched application, the foreground application, the sampling-date type, the sampling period, the preset electric quantity range, the preset duration range, the charging connection state, the network connection state, and the target prediction application are obtained respectively. The training sample is generated according to the feature values and the prediction value.

In some embodiments, the predetermined Bayesian model is trained according to the training samples generated and the attenuation parameters determined as follows. Multiple sample groups are obtained by grouping training samples with a same attenuation parameter into one group. For each of the multiple sample groups, the sample group and an attenuation parameter corresponding to the sample group are taken into a first preset formula for calculation, and probability for one of prediction values is obtained, where the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

where j1 is the first preset value, and j2 is the second preset value, the sample groups include $(S_1, S_2, \ldots, S_m)$, $1 \leq i \leq m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and P(j2) represents probability of an occurrence that j2 is set to be the prediction value. For each of the multiple sample groups, the prediction values, feature values, and the attenuation parameter corresponding to the sample group are taken into a second preset formula, and probability for each feature value when the prediction value is j2 is obtained, where the second preset formula is:

$$P(q_j | j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

where the feature values include $(q_1, q_2, \ldots, q_n)$, $1 \leq j \leq n$, $N_{S_i}(q_j, j2)$ represents the number of training samples generated with the feature value $q_j$ and j2.

In some embodiments, the at least one background application of the electronic device is controlled according to the trained Bayesian model as follows. A background-application cleanup instruction is obtained. The at least one background application and a current operation parameter of the electronic device are determined according to the background-application cleanup instruction. For each of the at least one background application, cleanup probability for the background application is calculated with the trained Bayesian model and the current operation parameter. At least one to-be-closed background application is determined from the at least one background application according to the cleanup probability for each of the at least one background application, and close the at least one to-be-closed background application.

In some embodiments, for each of the at least one background application, the cleanup probability for the background application is calculated with the trained Bayesian model and the current operation parameter as follows. Current feature values are determined according to the current operation parameter. The current feature values are taken into a third preset formula for calculation, and the cleanup probability is obtained, where the third preset formula is: $P_{cleanup} = P(j2) \prod_{k=1}^{n} P(q_k|j2)$, where $1 \leq k \leq n$, and $q_k$ is one of the current feature values.

In some embodiments, the at least one background application is embodied as a plurality of background applications. The at least one to-be-closed background application is determined from the at least one background application according to the cleanup probability for each of the at least one background application and close the at least one to-be-closed background application as follows. At least one background application each having cleanup probability greater than or equal to a preset threshold is selected from the plurality of background applications as the at least one to-be-closed background application, or a preset number background applications each with the highest cleanup probability are selected from the plurality of background applications as the at least one to-be-closed background application. Close the at least one to-be-closed background application.

As illustrated in FIG. 1, the method for controlling an application is applicable to an electronic device and includes the following.

At block 101, for each of sampling time points in a historical period, an operation parameter of the electronic device corresponding to the sampling time point is obtained (i.e., multiple operation parameters of the electronic device determined (or sampled) at respective sampling time points in the historical period are obtained), where the operation parameter includes a foreground application, remaining electric quantity, screen-on duration, a charging connection state, and a network connection state.

In the embodiment, the historical period may be set by a user. For example, the historical period is one or two months earlier than a current time point. The sampling time point refers to a sampling frequency (e.g., sampling is performed every minute or every two minutes) and may be expressed in a form of x year x month x day x hour x minute. The charging connection state includes a connected state and a disconnected state, and the network connection state includes a connected state and a disconnected state.

In practice, the operation parameters may be obtained in real time. For example, once a certain sampling time point reaches, data corresponding to the sampling time point is collected. The operation parameters may be obtained at one time. For instance, the electronic device can save data generated during the historical period to a local database in advance (e.g., data in association with each switch between a screen-on state and a screen-off state in the historical period, data in association with a change of a charing state in the historical period, data in association with a change of a network state in the historical period, and data in association with each initiating of an application in the historical period). Then the operation parameters corresponding to respective sampling time points in the historical period can be extracted at one time according to a sampling frequency.

At block 102, for each of the sampling time points in the historical period, an attenuation parameter corresponding to the operation parameter is determined according to the sampling time point (i.e., multiple attenuation parameters corresponding to the multiple operation parameters are determined according to respective sampling time points).

In some embodiments, operations at block 102 include the following. A sampling date is extracted from the sampling time point. A distribution position of the sampling date is determined from all distribution positions of the historical period. The attenuation parameter corresponding to the operation parameter is obtained according to the distribution position.

In the embodiment, attenuation parameters corresponding to different distribution positions can be set in advance. Attenuation parameters and distribution positions may be in a one-to-one correspondence (i.e., the attenuation parameter is attenuated once a day) or in a one-to-many correspondence (i.e., the attenuation parameter is attenuated every multiple days). Considering that when a distribution position of a sampling time point is adjacent to a first distribution position of the historical period, it indicates that the sampling time point is away from a current time point, and since data collected at the sampling time point has low reference-ability, a value of an attenuation parameter corresponding to the sampling time point can be set to be relatively small.

At block 103, for each of the sampling time points in the historical period, at least one training sample is generated according to the sampling time point and the operation parameter (i.e., multiple training samples are generated according to the sampling time points and the multiple operation parameters).

Figure 2:
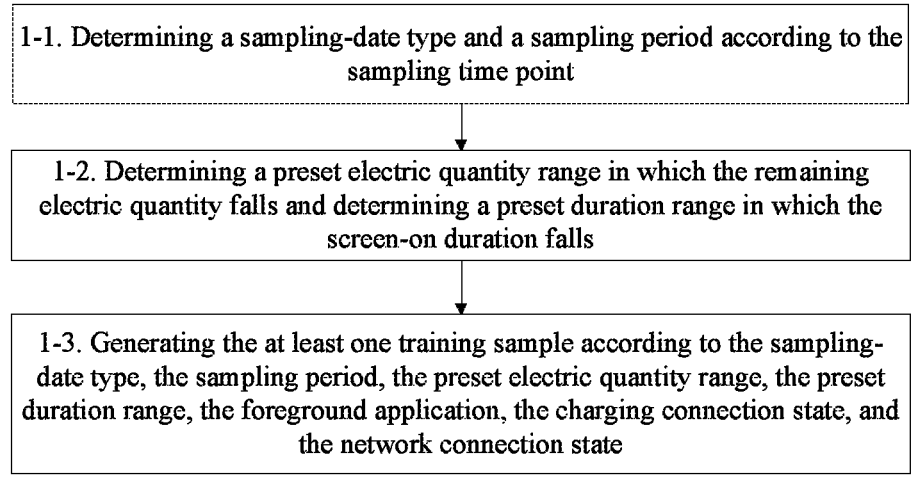
FIG. 2 is a schematic flow chart illustrating operations at block 103 according to embodiments.

In some embodiments, as illustrated in FIG. 2, operations at block 103 include the following.

At block 1-1, a sampling-date type and a sampling period are determined according to the sampling time point.

In the embodiment, the sampling-date type may be obtained by dividing each week, for example, each week is divided to weekdays and rest days (i.e., the sampling-date type relates to a weekday type and a weekend type). The sampling period may be obtained by dividing each day in units of hours, for example, each day is divided to be 48 periods (i.e., the sampling period relates to 48 periods).

At block 1-2, a preset electric quantity range in which the remaining electric quantity falls is determined and a preset duration range in which the screen-on duration falls is determined.

In the embodiment, the preset electric quantity range and the preset duration range may be set by the user. The preset electric quantity range may be an electric quantity range indicating high electric quantity, an electric quantity range indicating medium electric quantity, or an electric quantity range indicating low electric quantity. For instance, the electric quantity range indicating high electric quantity is a range of 70% to 100%, the electric quantity range indicating medium electric quantity is a range of 40% to 70%, and the electric quantity range indicating low electric quantity is a range of 0 to 40%. The preset duration range may be a duration range indicating short duration, a duration range indicating medium duration, or a duration range indicating long duration. For instance, the duration range indicating long duration is a range of more than 10 minutes, the duration range indicating medium duration is a range of 5 minutes to 10 minutes, and the duration range indicating short duration is a range of 0 to 5 minutes.

At block 1-3, the at least one training sample is generated according to the sampling-date type, the sampling period, the preset electric quantity range, the preset duration range, the foreground application, the charging connection state, and the network connection state.

In some embodiments, operations at block 1-3 include the following.

At 1-3-1, at least one target prediction application is obtained (i.e., determined).

In the embodiment, the at least one target prediction application may include all applications or some applications installed in the electronic device. In the case that the at least one target prediction application includes some applications, the applications may be several applications that have been used most frequently recently, and the number of the applications is determined according to actual needs.

At 1-3-2, according to the sampling time point, a last switched application running before the foreground application and a next switched application running after the foreground application are determined from operation parameters obtained (where the operation parameters are sampled at respective sampling time points, and may be obtained in real time or at one time).

In the embodiment, a foreground application sampled (or determined) at any sampling time point in the historical period is known. For a foreground application determined at a sampling time point, each foreground application determined at a sampling time point earlier than the sampling time point can be considered as a last switched application running before the foreground application, and each foreground application determined at a sampling time point later than the sampling time point can be considered as a next switched application running after the foreground application. Generally, a foreground application determined at a sampling time point earlier than a current sampling time point and closest to the current sampling time point than other sampling time points can be determined as the last switched application, and a foreground application determined at a sampling time point later than the current sampling time point and closest to the current sampling time point than other sampling time points can be determined as the next switched application. In practice, all foreground applications may be sorted according to sampling time points at which the foreground applications are determined. For any three adjacent different foreground applications among the foreground applications arranged according to the sampling time points, a foreground application ahead of a foreground application in a middle position can be determined as a last switched application running before the foreground application in the middle position, and a foreground application after the foreground application in the middle position can be determined as a next switched application running after the foreground application in the middle position.

At 1-3-3, for each of the at least one target prediction application, a prediction value for the target prediction application is determined according to the sampling time point, the next switched application, and the foreground application.

In the embodiment, the prediction value may be a value set by the user. For example, the prediction value is 0 or 1, where the prediction value being 0 represents that the target prediction application will not be switched to the foreground in a short time, and the prediction value being 1 represents that the target prediction application will be switched to the foreground in a short time. Since all foreground applications determined at sampling time points in the historical period are known, the prediction value for the target prediction application can be determined according to the known foreground applications and sampling time points at which the known foreground applications are determined. In some embodiments, operations at 1-3-3 include the following. A difference between a sampling time point at which the next switched application is determined and the sampling time point at which the foreground application is determined is calculated. Whether the target prediction application is the next switched application and whether the difference fails to exceed preset time length are determined. Upon determining that the target prediction application is the next switched application and the difference fails to exceed the preset time length, a first preset value is set to be the prediction value for the target prediction application. Upon determining that the target prediction application is not the next switched application or the difference exceeds the preset time length, a second preset value is set to be the prediction value for the target prediction application.

In the embodiment, the preset time length, the first preset value, and the second preset value may be set by the user. The preset time length is time length. The preset time length corresponds to 10 minutes for example. The first preset value is 1 and the second preset value is 0 for example. For each sampling, when the target prediction application to be predicted is the next switched application, time length required for switching from a current application to the next switched application needs to be further determined. The prediction value for the target prediction application is set to be 1 only when the time length is within the preset time length; otherwise, the prediction value for the target prediction application is set to be 0.

At 1-3-4, for each of the at least one target prediction application, a training sample among the at least one training sample is generated according to the last switched application, the foreground application, the sampling-date type, the sampling period, the preset electric quantity range, the preset duration range, the charging connection state, the network connection state, the target prediction application, and the prediction value.

In the embodiment, user behaviors are analyzed from multiple dimensions, such that a trained machine learning model is relatively personified. Each training sample may include data of multiple known feature items and a label item. The feature items may include the last switched application, the foreground application, the sampling-date type, the sampling period, the preset electric quantity range, the preset duration range, the charging connection state, the network connection state, and so on. The label item may include the the prediction value.

In some embodiments, operations at 1-3-4 include the following. Feature values corresponding to the last switched application, the foreground application, the sampling-date type, the sampling period, the preset electric quantity range, the preset duration range, the charging connection state, the network connection state, and the target prediction application are obtained respectively. The training sample is generated according to the feature values and the prediction value.

In the embodiment, since computer programs are generally encoded in a form of characters, the feature value is mainly expressed in a form of Arabic numbers or letters (e.g., the feature value is expressed in a form of 1-10). Each feature item is also expressed in a form of letters. For example, a feature item corresponding to the foreground application is H, a feature item corresponding to the sampling-date type is B. The training sample is generated by directly using the feature values as prior conditions and a prediction value for each target prediction application as a posterior result.

It can be understood that, the feature values corresponding to the feature items can be set in advance. Feature values of different feature items may be the same or different. For example, both a feature value corresponding to the foreground application and a feature value corresponding to the sampling period can be expressed in the form of 0-10. However, for different feature items, a same number may have different meanings. For instance, for the foreground application, 0 represents a group purchase application while 0 represents a period of 0:00-1:00 for the sampling period.

At block 104, a predetermined Bayesian model is trained according to training samples generated and attenuation parameters determined.

In some embodiments, operations at block 104 include the following. Multiple sample groups are obtained by grouping training samples with a same attenuation parameter into one group. For each of the multiple sample groups, the sample group and an attenuation parameter corresponding to the sample group are taken into a first preset formula for calculation, and probability for one of prediction values is obtained, where the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

where j1 is the first preset value, and j2 is the second preset value, the sample groups include $(S_1, S_2, \ldots, S_m)$, $1 \le i \le m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and P(j2) represents probability of an occurrence that j2 is set to be the prediction value. For each of the multiple sample groups, the prediction values, feature values, and the attenuation parameter corresponding to the sample group are taken into a second preset formula, and probability for each feature value when the prediction value is j2 is obtained, where the second preset formula is:

$$P(q_j|j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

where the feature values include $(q_1, q_2, \ldots, q_n)$, $1 \le j \le n$, $N_{S_i}(q_j, j2)$ represents the number of training samples generated with the feature value $q_j$ and j2.

In the embodiment, the Bayesian model may be:

$$P(J|q_1, q_2 \ldots q_n) = \frac{P(q_1, q_2 \ldots q_n|J) \times P(J)}{P(q_1, q_2 \ldots q_n)},$$

where $q_1, q_2, \ldots, q_n$ are prior conditions, $q_n$ is a feature value corresponding to an $n^{th}$ feature item, and J is the prediction value for the target prediction application. To simplify the calculation, supposing $q_1, q_2, \ldots q_n$ are independent of each other, $$P(J|q_1, q_2 \ldots q_n) = \frac{P(q_1|J)P(q_2|J) \ldots P(q_n|J)}{P(q_1)P(q_2) \ldots P(q_n)},$$

a naive Bayes classifier model (i.e., JMAX=arg max P(J|$q_1$, $q_2 \ldots q_n$)=arg maxP($q_1$|J)P($q_2$|J) $\ldots$ P($q_n$|J), where J represents j1 or j2) can be obtained. Since there is a correspondence between sampling time points and attenuation parameters, feature items corresponding to a same attenuation parameter can be grouped into one sample group according to sampling time points before statistics. In this way, multiple sample groups $[s_1, s_2, s_3, \ldots s_m]$ can be obtained, and each sample group corresponds to an attenuation parameter. Then the probability for one of the prediction values is calculated with the first preset formula and the probability for one of the prediction values and one of the feature values is calculated with the second preset formula. It should be understood that, a process of training the Bayesian model is a process of probability statistics. That is, for each of the feature items, probability for a feature value corresponding to the feature item (e.g., $P(q_1)$ and $P(q_1|j2)$) can be obtained after the Bayesian model is trained.

At block 105, at least one background application of the electronic device is controlled according to the trained Bayesian model.

Figure 3:
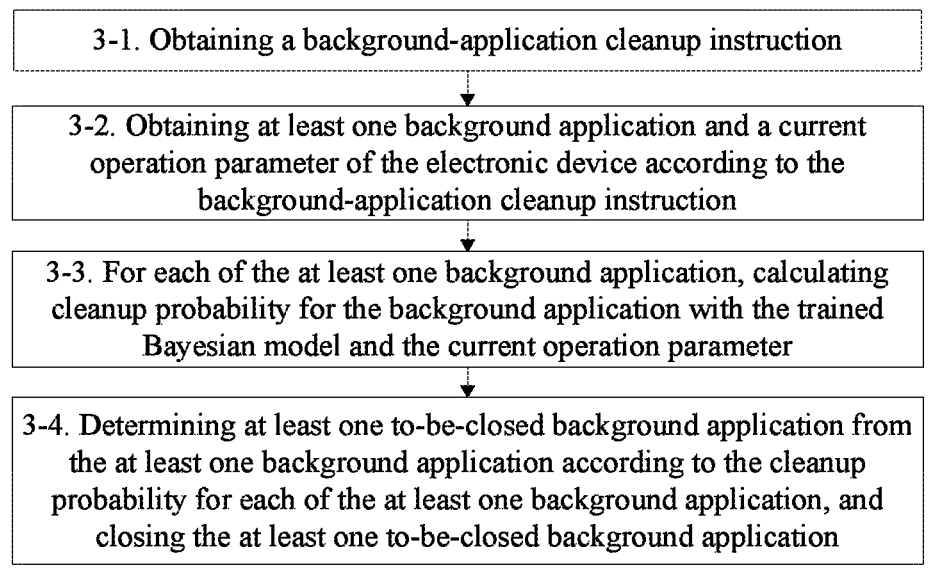
FIG. 3 is a schematic flow chart illustrating operations at block 105 according to embodiments.

In some embodiments, as illustrated in FIG. 3, operations at block 105 include the following.

At block 3-1, a background-application cleanup instruction is obtained.

In the embodiment, the background-application cleanup instruction may be automatically generated by the electronic device. For instance, the background-application cleanup instruction is generated in the case that occupied memory reaches a certain limit, electric quantity is insufficient, or a running speed is low. The background-application cleanup instruction may also be generated in response to a user's operation. For example, the background-application cleanup instruction is generated in response to an operation of clicking a designated cleaning icon by the user.

At block 3-2, the at least one background application and a current operation parameter of the electronic device are obtained (i.e., determined) according to the background-application cleanup instruction.

At block 3-3, for each of the at least one background application, cleanup probability for the background application (i.e., probability of cleaning up the background application) is calculated with the trained Bayesian model and the current operation parameter.

In some embodiments, operations at block 3-3 include the following. Current feature values are determined according to the current operation parameter. The current feature values are taken into a third preset formula for calculation, and the cleanup probability for the background application is obtained, where the third preset formula is: $P_{cleanup}=P(j2) \prod_{k=1}^{n} P(q_k|j2)$, where $1 \leq k \leq n$, and $q_k$ is one of the current feature values (i.e., a $k^{th}$ current feature value).

In the embodiment, similar to a training process, a current sampling-date type, a current sampling period, a current preset electric quantity range, a current preset duration range, a last switched application running before a current foreground application, the current foreground application, a current charging connection state, a current network connection state, and a background application that needs to be predicted (i.e., nine feature items, and n is 9,) can be obtained according to the current operation parameter, and then feature values $q_1, q_2 \ldots q_9$ corresponding to the nine feature items (i.e., current feature values) can be obtained. Probability for j2 in the case that the current feature values exist (i.e., the probability that the background application that needs to be predicted will not be switched to the foreground in a short time) can be calculated with a formula: $P(j2|q_1, q_2 \ldots q_9)=P(j2) P(q_1|j2)P(q_2|j2) \ldots P(q_9|j2)$, and the probability for j2 in the case that the current feature values exist is used as the cleanup probability, where $P(q_k|j2)$ has been calculated at block 104 and can be directly obtained.

At block 3-4, at least one to-be-closed background application are determined from the at least one background application according to the cleanup probability for each of the at least one background application, and close the at least one to-be-closed background application.

In some embodiments, the at least one background application is embodied as a plurality of background applications, operations at block 3-4 include the following. At least one background application each having cleanup probability greater than or equal to a preset threshold is selected from the plurality of background applications as the at least one to-be-closed background application, or a preset number background applications each with the highest cleanup probability are selected from the plurality of background applications as the at least one to-be-closed background application. Close the at least one to-be-closed background application.

In the embodiment, the preset threshold and the preset number herein may be set by the user. The preset threshold is 0.9 and the preset number is 4 for example, background application i is considered not to be switched to the foreground in a short time when $P(j2|q_1, q_2 \ldots q_n)$ calculated is greater than 0.9. In this case, background application i is selected as a cleanable object and cleaned up.

According to the method for controlling an application of embodiments which is applicable to the electronic device, for each of the sampling time points in the historical period, the operation parameter of the electronic device corresponding to the sampling time point can be obtained, where the operation parameter includes the foreground application, the remaining electric quantity, the screen-on duration, the charging connection state, and the network connection state. For each of the sampling time points in the historical period, the attenuation parameter corresponding to the operation parameter can be determined according to the sampling time point. For each of the sampling time points in the historical period, the at least one training sample can be generated according to the sampling time point and the operation parameter. The predetermined Bayesian model can be trained according to the training samples generated and the attenuation parameters determined. The at least one background application of the electronic device can be controlled according to the trained Bayesian model. In this way, the at least one background application to be cleaned up can be relatively accurately selected according to historical usage information of applications. Furthermore, the method is simple and flexible, which saves system resources and has a good user experience.

According to embodiments, the following are described in detail taking an electronic device integrated with a device for controlling an application as an example.

Figure 4:
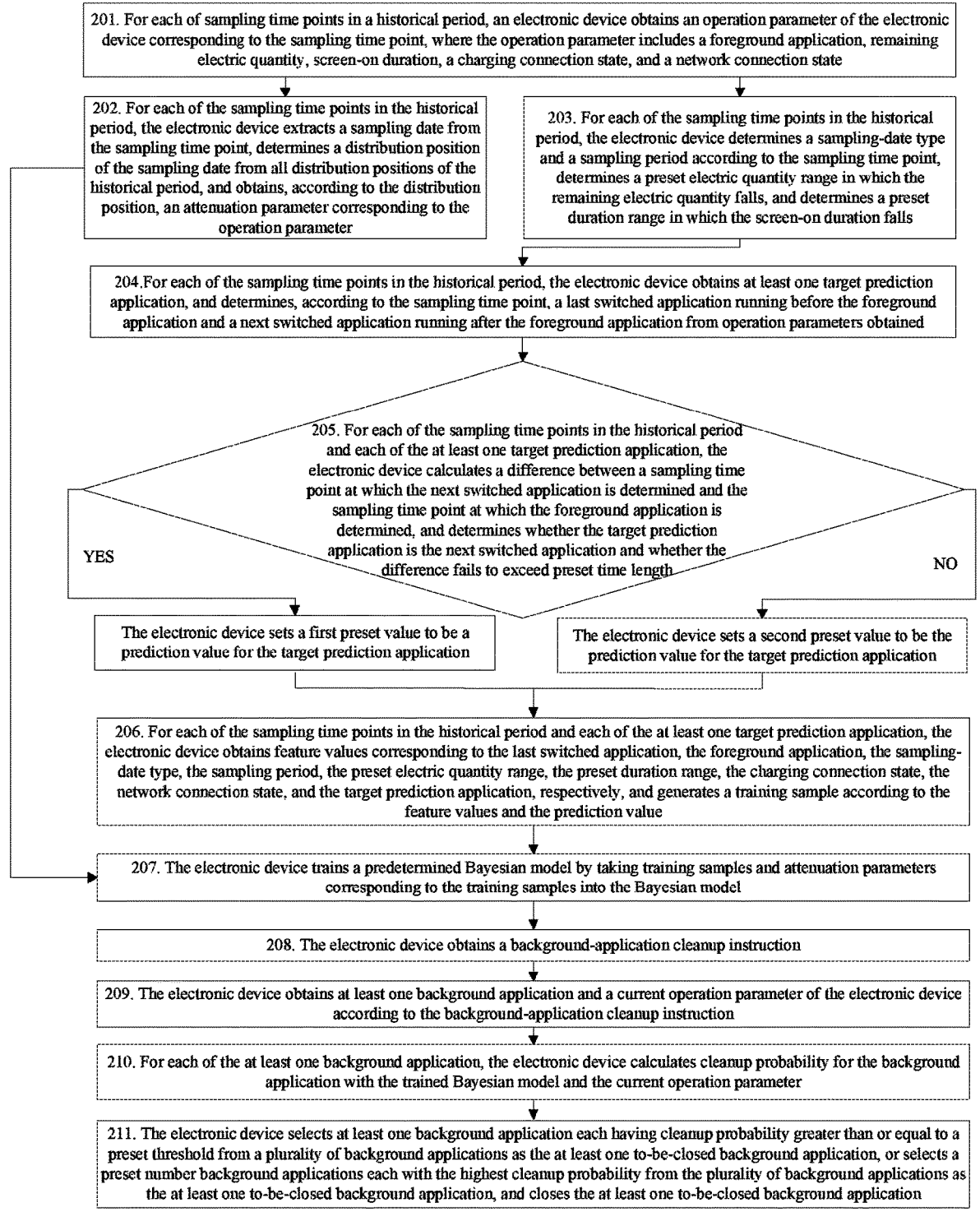
FIG. 4 is a schematic flow chart illustrating a method for controlling an application according to other embodiments.
Figure 5:
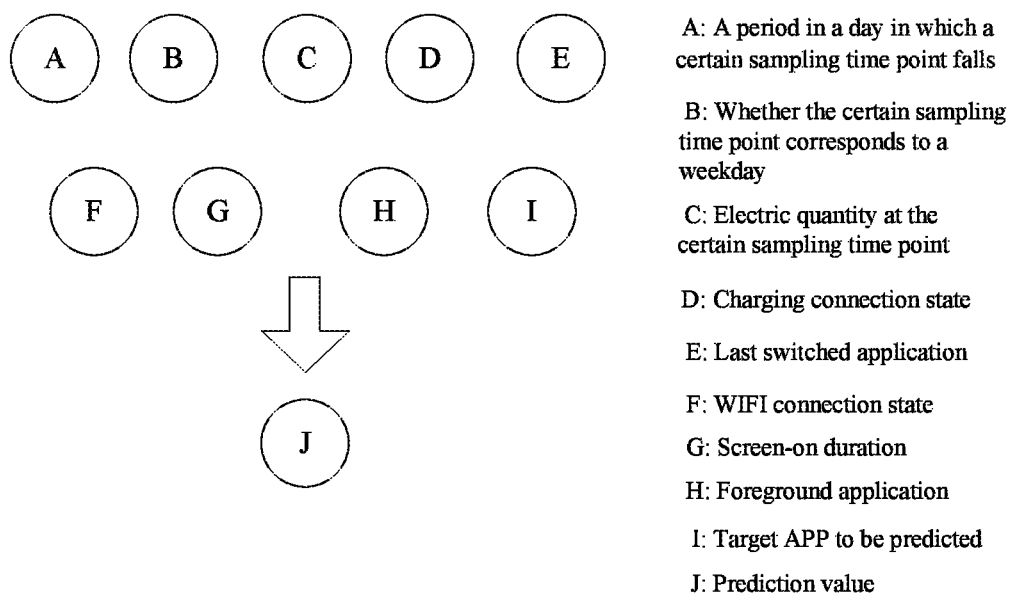
FIG. 5 is a block diagram illustrating a Bayesian model according to embodiments.

As illustrated in FIG. 4 and FIG. 5, a method for controlling an application includes the following.

At block 201, for each of sampling time points in a historical period, the electronic device obtains an operation parameter of the electronic device corresponding to the sampling time point (i.e., multiple operation parameters of the electronic device determined at respective sampling time points in the historical period are obtained), where the operation parameter includes a foreground application, remaining electric quantity, screen-on duration, a charging connection state, and a network connection state.

For example, the historical period is one month earlier than a current time point (i.e., a past month) and the sampling time point may be any minute of the past month. The operation parameters may be extracted from a database. The database may store usage records of applications of the electronic device, state records of a screen of the electronic device (i.e., switch between a screen-on state or a screen-off state), charging records of the electronic device, and WiFi connection records of the electronic device in the past month (see Tables 1-4). According to these records, the operation parameters corresponding to respective sampling time points can be extracted.

TABLE 1 usage records of applications

| The name of an application | Timestamp corresponding to a time point at which the application is activated |
|---|---|
| com.tencent.mobileqq | 1497590695469 |
| com.android.settings | 1497609107922 |
| . . . | . . . |

TABLE 2

Screen state records

| Screen state switch | Timestamp |
|---|---|
| screen-on –> screen-off | 1497609131975 |
| screen-off –> screen-on | 1497609191786 |
| . . . | . . . |

TABLE 3

Charging records

| Charging state switch | Electric quantity | Timestamp |
|---|---|---|
| Charging | 23% | 1497609131910 |
| Exiting from charging | 80% | 1497609191786 |
| . . . | | . . . |

TABLE 4

| | Wifi records | | |
|---|---|---|---|
| Wifi state switch | SSID | BSSID | Timestamp |
| Connecting to wifi | ... | ... | 1497609111510 |
| Disconnecting from wifi | ... | ... | 1497609131286 |
| ... | | | ... |

At block 202, for each of the sampling time points in the historical period, the electronic device extracts a sampling date from the sampling time point, determines a distribution position of the sampling date from all distribution positions of the historical period, and obtains, according to the distribution position, an attenuation parameter corresponding to the operation parameter.

The historical period is for example a period of 00:00 on Oct. 1, 2012 to 24:59 on Oct. 31, 2012 and the sampling time point is for example 10:55 on Oct. 17, 2012, the extracted sampling date is Oct. 17, 2012, and the distribution position of the sampling date is 17/31. Then an attenuation parameter corresponding to 17/31 can be obtained.

At block 203, for each of the sampling time points in the historical period, the electronic device determines a sampling-date type and a sampling period according to the sampling time point, determines a preset electric quantity range in which the remaining electric quantity falls, and determines a preset duration range in which the screen-on duration falls.

The sampling time point is 10:55 on Oct. 17, 2012 and each day is divided into 48 periods for example, if Oct. 17, 2012 is Wednesday, the sampling-date type is the weekday type and the sampling period is an 11$^{th}$ period. If the remaining electric quantity is 80%, the preset electric quantity range is a range of 70% to 100% indicating high electric quantity. If the screen-on duration is 3 minutes, the preset duration range is a range of 0 to 5 minutes indicating short duration.

At block 204, for each of the sampling time points in the historical period, the electronic device obtains at least one target prediction application and determines, according to the sampling time point, a last switched application running before the foreground application and a next switched application running after the foreground application from operation parameters obtained.

The at least one target prediction application includes ten most-frequently-used applications (i.e., APP1, APP2, ..., APP10) for example. All foreground applications may be sorted according to sampling time points at which the foreground applications are determined. Taking any three adjacent different foreground applications among the foreground applications arranged according to the sampling time points as an example, a foreground application ahead of a foreground application in a middle position is determined as a last switched application running before the foreground application in the middle position, and a foreground application after the foreground application in the middle position is determined as a next switched application running after the foreground application in the middle position. As an example, for a certain sampling time point, the foreground application is APP10, the last switched application is APP1, and the next switched application is APP5.

At block 205, for each of the sampling time points in the historical period and each of the at least one target prediction application, the electronic device calculates a difference between a sampling time point at which the next switched application is determined and the sampling time point at which the foreground application is determined, determines whether the target prediction application is the next switched application and whether the difference fails to exceed preset time length, sets a first preset value to be a prediction value for the target prediction application upon determining that the target prediction application is the next switched application and the difference fails to exceed the preset time length, and sets a second preset value to be the prediction value for the target prediction application upon determining that the target prediction application is not the next switched application or the difference exceeds the preset time length.

The foreground application determined by sampling is APP10 for example, time length T1 between a sampling time point at which the next switched application APP5 is determined by sampling and a sampling time point at which the foreground application APP10 is determined by sampling is 5 minutes for example, the first preset value is 1 and the second preset value is 0 for example, and the preset time length is 10 minutes for example, if the target prediction application is the next switched application APP5 and T1≤10, the prediction value for the target prediction application is set to be 1; otherwise, the prediction value for the target prediction application is set to be 0.

At block 206, for each of the sampling time points in the historical period and each of the at least one target prediction application, the electronic device obtains feature values corresponding to the last switched application, the foreground application, the sampling-date type, the sampling period, the preset electric quantity range, the preset duration range, the charging connection state, the network connection state, and the target prediction application, respectively, and generates a training sample according to the feature values and the prediction value.

As an example, a correspondence between the feature values and feature items is illustrated in Table 5 below.

TABLE 5

| Feature items | Feature values |
|---|---|
| Sampling period A | The number of a period in a day in which a certain sampling time point falls (every 30 minutes corresponds to a period, there are 48 periods in a day, and the 48 periods are sequentially numbered as [0, 1, 2, ..., 47]) |
| Sampling-date type B | Whether the certain sampling time point corresponds to a weekday or weekend (1: weekday, 0: weekend) |
| Remaining electric quantity C | Electric quantity (0: high electric quantity, 1: medium electric quantity, 2: low electric quantity) |
| Charging connection state D | Whether the electronic device is charged at the certain sampling time point (0: not charged, 1: charged) |
| Last switched application E | An APP running at a sampling time point earlier than the certain sampling time point |
| Network connection state F | Wifi state at the certain sampling time point (0: disconnected, 1: connected) |
| Screen-on duration G | Time length between a sampling time point at which a screen was lit up and the certain sampling time point (0: short, 1: medium, 2: long), time length less than 5 minutes belongs to short duration, time length greater than 5 minutes and less than 10 minutes belongs to middle duration, and time length greater than 10 minutes belongs to long duration |
| Foreground application H | The number of a foreground APP sampled at the certain sampling time point (0, 1, 2, ..., ) |
| Target prediction | The number of an APP which needs to be predicted whether the APP will be switched |

TABLE 5-continued

| Feature items | Feature values |
| --- | --- |
| application I | to foreground within 10 minutes (0, 1, 2, . . . ,) |
| Prediction value J | Whether the target prediction application needs to be cleaned up (0: cleaning, 1: no cleaning) |

It should be noted that, the order of execution of the foregoing operations labeled 202 and the foregoing operations labeled 203-206 are not limited according to embodiments of the disclosure. In some embodiments, operations at block 202 and operations at block 203-206 are performed in parallel.

At block 207, the electronic device trains a predetermined Bayesian model by taking training samples and attenuation parameters corresponding to the training samples into the Bayesian model.

In some embodiments, operations at block 207 include the following. Multiple sample groups are obtained by grouping training samples with a same attenuation parameter into one group. For each of the multiple sample groups, the sample group and an attenuation parameter corresponding to the sample group are taken into a first preset formula for calculation, and probability for one of prediction values is obtained, where the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

where j1 is the first preset value, and j2 is the second preset value, the sample groups include $(S_1, S_2, \ldots, S_m)$, $1 \leq i \leq m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and $P(j2)$ represents probability of an occurrence that j2 is set to be the prediction value. For each of the multiple sample groups, the prediction values, feature values, and the attenuation parameter corresponding to the sample group are taken into a second preset formula, and probability for each feature value when the prediction value is j2 is obtained, where the second preset formula is:

$$P(q_j|j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

where the feature values include $(q_1, q_2, \ldots, q_n)$, $1 \leq j \leq n$, $N_{S_i}(q_j, j2)$ represents the number of training samples generated with the feature value $q_j$ and j2.

For example, the Bayesian model is:

$$P(J|q_1, q_2 \ldots q_n) = \frac{P(q_1, q_2 \ldots q_n|J) \times P(J)}{P(q_1, q_2 \ldots q_n)},$$

where $q_1, q_2, \ldots, q_n$ are prior conditions, $q_n$ is a feature value corresponding to an $n^{th}$ feature item, and J is the prediction value for the target prediction application. To simplify the calculation, supposing $q_1, q_2, \ldots q_n$ are independent of each other, $$P(J|q_1, q_2 \ldots q_n) = \frac{P(q_1|J)P(q_2|J) \ldots P(q_n|J)}{P(q_1)P(q_2) \ldots P(q_n)},$$

a naive Bayes classifier model (i.e., JMAX=arg max $P(J|q_1, q_2 \ldots q_n)$=arg max$P(q_1|J)P(q_2|J) \ldots P(q_n|J)$, where J represents j1 or j2) can be obtained. Since there is a correspondence between sampling time points and attenuation parameters, feature items corresponding to a same attenuation parameter can be grouped into one sample group according to sampling time points before statistics. In this way, multiple sample groups $[s_1, s_2, s_3, \ldots, s_m]$ can be obtained, and each sample group corresponds to an attenuation parameter. Then the probability for one of the prediction values is calculated with the first preset formula and the probability for one of the prediction values and one of the feature values is calculated with the second preset formula. It should be understood that, a process of training the Bayesian model is a process of probability statistics. That is, for each of the feature items, probability for a feature value corresponding to the feature item (e.g., $P(q_1)$ and $P(q_1|j2)$) can be obtained after the Bayesian model is trained.

At block 208, the electronic device obtains a background-application cleanup instruction.

As an example, the electronic device automatically generates the background-application cleanup instruction in the case that occupied memory reaches a certain limit, electric quantity is insufficient, or a running speed is low.

At block 209, the electronic device obtains at least one background application and a current operation parameter of the electronic device according to the background-application cleanup instruction.

At block 210, for each of the at least one background application, the electronic device calculates cleanup probability for the background application with the trained Bayesian model and the current operation parameter.

In some embodiments, operations at block 210 include the following. Current feature values are determined according to the current operation parameter. The current feature values are taken into a third preset formula for calculation, and the cleanup probability for the background application is obtained, where the third preset formula is: $P_{cleanup}=P(j2) \Pi_{k=1}^{n} P(q_k|j2)$, where $1 \leq k \leq n$, and $q_k$ is one of the current feature values.

For example, similar to a training process, a current sampling-date type, a current sampling period, a current preset electric quantity range, a current preset duration range, a last switched application running before a current foreground application, the current foreground application, a current charging connection state, a current network connection state, and a background application that needs to be predicted (i.e., nine feature items, and n is 9,) can be obtained according to the current operation parameter, and then feature values $q_1, q_2 \ldots q_9$ corresponding to the nine feature items can be obtained. Probability for j2 in the case that the current feature values exist (i.e., the probability that the background application that needs to be predicted will not be switched to the foreground in a short time) can be calculated with a formula: $P(j2|q_1, q_2 \ldots q_9)=P(j2) P(q_1|j2)$ $P(q_2|j2) \ldots P(q_9|j2)$, and the probability for j2 in the case that the current feature values exist is used as the cleanup probability.

At block 211, the electronic device selects at least one background application each having cleanup probability greater than or equal to a preset threshold from a plurality of background applications as at least one to-be-closed background application, or selects a preset number background applications each with the highest cleanup probability from the plurality of background applications as the at least one to-be-closed background application, and closes the at least one to-be-closed background application, where the at least one background application is embodied as the plurality of background applications.

The preset threshold is 0.9 and the preset number is 4 for example, a background application to be predicted is considered not to be switched to the foreground in a short time when $P(j2|q_1, q_2 \ldots q_n)$ calculated is greater than 0.9. In this case, the background application to be predicted is selected as a cleanable object and cleaned up.

As can be seen, according to the method for controlling an application of embodiments, for each of the sampling time points in the historical period, the electronic device can obtain the operation parameter of the electronic device corresponding to the sampling time point (where the operation parameter includes a foreground application, remaining electric quantity, screen-on duration, a charging connection state, and a network connection state). For each of the sampling time points in the historical period, the electronic device can extract the sampling date from the sampling time point, determine the distribution position of the sampling date from all the distribution positions of the historical period, and obtain, according to the distribution position, the attenuation parameter corresponding to the operation parameter. For each of the sampling time points in the historical period, the electronic device can determine the sampling-date type and the sampling period according to the sampling time point, determine the preset electric quantity range in which the remaining electric quantity falls, and determine the preset duration range in which the screen-on duration falls. For each of the sampling time points in the historical period, the electronic device can obtain the at least one target prediction application, and determine, according to the sampling time point, the last switched application running before the foreground application and the next switched application running after the foreground application from operation parameters obtained. For each of the sampling time points in the historical period and each of the at least one target prediction application, the electronic device can calculate the difference between a sampling time point at which the next switched application is determined and the sampling time point at which the foreground application is determined, determine whether the target prediction application is the next switched application and whether the difference fails to exceed preset time length, sets a first preset value to be the prediction value for the target prediction application upon determining that the target prediction application is the next switched application and the difference fails to exceed the preset time length, and set a second preset value to be the prediction value for the target prediction application upon determining that the target prediction application is not the next switched application or the difference exceeds the preset time length. For each of the sampling time points in the historical period and each of the at least one target prediction application, the electronic device can obtain the feature values corresponding to the last switched application, the foreground application, the sampling-date type, the sampling period, the preset electric quantity range, the preset duration range, the charging connection state, the network connection state, and the target prediction application, respectively, and generate the training sample according to the feature values and the prediction value. The electronic device can train the predetermined Bayesian model by taking the training samples and the attenuation parameters corresponding to the training samples into the Bayesian model. The electronic device can obtain the background-application cleanup instruction, and obtain the at least one background application and the current operation parameter of the electronic device according to the background-application cleanup instruction. For each of the at least one background application, the electronic device can calculate the cleanup probability for the background application with the trained Bayesian model and the current operation parameter. The electronic device can select the at least one background application each having cleanup probability greater than or equal to the preset threshold as at least one target application, or selects a preset number background applications each with the highest cleanup probability as the at least one target application, and close the at least one target application. In this way, the at least one background application to be cleaned up can be relatively accurately selected according to historical usage information of applications. Furthermore, the method is simple and flexible, which saves system resources and has a good user experience.

While the method for controlling an application has been described in conjunction with the foregoing embodiments, the following embodiments will be further described from the perspective of a device for controlling an application. The device may be embodied as an independent entity or integrated with an electronic device, such as a terminal. The terminal may include a mobile phone, a tablet computer, and a personal computer.

According to embodiments of the disclosure, a device for controlling an application is provided. The device is applicable to an electronic device. The device includes an obtaining module, a determining module, a generating module, a training module, and a controlling module. For each of sampling time points in a historical period, the obtaining module is configured to obtain an operation parameter of the electronic device corresponding to the sampling time point, where the operation parameter includes a foreground application, remaining electric quantity, screen-on duration, a charging connection state, and a network connection state. For each of the sampling time points in the historical period, the determining module is configured to determine, according to the sampling time point, an attenuation parameter corresponding to the operation parameter. For each of the sampling time points in the historical period, the generating module is configured to generate at least one training sample according to the sampling time point and the operation parameter. The training module is configured to train a predetermined Bayesian model according to training samples generated and attenuation parameters determined. The controlling module is configured to control at least one background application of the electronic device according to the trained Bayesian model.

In some embodiments, the determining module is configured to: extract a sampling date from the sampling time point; determine a distribution position of the sampling date from all distribution positions of the historical period; and obtain, according to the distribution position, the attenuation parameter corresponding to the operation parameter.

In some embodiments, the generating module includes a first determining sub-module, a second determining sub-module, and a generating sub-module. The first determining sub-module is configured to determine a sampling-date type and a sampling period according to the sampling time point. The second determining sub-module is configured to determine a preset electric quantity range in which the remaining electric quantity falls and determine a preset duration range in which the screen-on duration falls. The generating sub-module is configured to generate the at least one training sample according to the sampling-date type, the sampling period, the preset electric quantity range, the preset duration range, the foreground application, the charging connection state, and the network connection state.

In some embodiments, the generating sub-module includes an obtaining unit, a first determining unit, a second determining unit, and a generating unit. The obtaining unit is configured to obtain at least one target prediction application. The first determining unit is configured to determine, according to the sampling time point, a last switched application running before the foreground application and a next switched application running after the foreground application from operation parameters obtained. The second determining unit is configured to, for each of the at least one target prediction application, determine a prediction value for the target prediction application according to the sampling time point, the next switched application, and the foreground application. The generating unit is configured to, for each of the at least one target prediction application, generate a training sample among the at least one training sample according to the last switched application, the foreground application, the sampling-date type, the sampling period, the preset electric quantity range, the preset duration range, the charging connection state, the network connection state, the target prediction application, and the prediction value.

In some embodiments, the second determining unit is configured to: calculate a difference between a sampling time point at which the next switched application is determined and the sampling time point at which the foreground application is determined; determine whether the target prediction application is the next switched application and whether the difference fails to exceed preset time length; set a first preset value to be the prediction value for the target prediction application, when the target prediction application is the next switched application and the difference fails to exceed the preset time length; and set a second preset value to be the prediction value for the target prediction application, when the target prediction application is not the next switched application or the difference exceeds the preset time length.

In some embodiments, the generating unit is configured to: obtain feature values corresponding to the last switched application, the foreground application, the sampling-date type, the sampling period, the preset electric quantity range, the preset duration range, the charging connection state, the network connection state, and the target prediction application, respectively; and generate the training sample according to the feature values and the prediction value.

In some embodiments, the training module is configured to: obtain multiple sample groups by grouping training samples with a same attenuation parameter into one group; for each of the multiple sample groups, take the sample group and an attenuation parameter corresponding to the sample group into a first preset formula for calculation, and obtain probability for one of prediction values, where the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

where j1 is the first preset value, and j2 is the second preset value, the sample groups include $(S_1, S_2, \ldots, S_m)$, $1 \le i \le m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and P(j2) represents probability of an occurrence that j2 is set to be the prediction value; and for each of the multiple sample groups, take the prediction values, feature values, and the attenuation parameter corresponding to the sample group into a second preset formula, and obtain probability for each feature value when the prediction value is j2, where the second preset formula is:

$$P(q_j | j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

where the feature values include $(q_1, q_2, \ldots, q_n)$, $1 \le j \le n$, $N_{S_i}(q_j, j2)$ represents the number of training samples generated with the feature value $q_j$ and j2.

In some embodiments, the controlling module is configured to: obtain a background-application cleanup instruction; obtain the at least one background application and a current operation parameter of the electronic device according to the background-application cleanup instruction; for each of the at least one background application, calculate cleanup probability for the background application with the trained Bayesian model and the current operation parameter; and determine at least one to-be-closed background application from the at least one background application according to the cleanup probability for each of the at least one background application and close the at least one to-be-closed background application.

Figure 6:
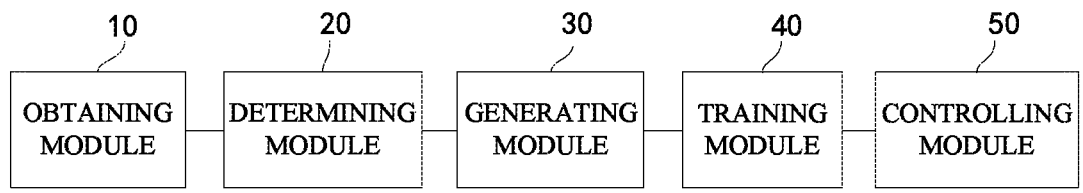
FIG. 6 is a schematic structural diagram illustrating a device for controlling an application according to embodiments.

FIG. 6 illustrates a device for controlling an application according to embodiments of the disclosure. The device is applicable to an electronic device. As illustrated in FIG. 6, the device includes an obtaining module 10, a determining module 20, a generating module 30, a training module 40, and a controlling module 50.

(1) The obtaining module 10: for each of sampling time points in a historical period, the obtaining module 10 is configured to obtain an operation parameter of the electronic device corresponding to the sampling time point (i.e., the obtaining module 10 is configured to obtain multiple operation parameters of the electronic device determined at respective sampling time points in the historical period), where the operation parameter includes a foreground application, remaining electric quantity, screen-on duration, a charging connection state, and a network connection state.

In the embodiment, the historical period may be set by a user. For example, the historical period is one or two months earlier than a current time point. The sampling time point refers to a sampling frequency (e.g., sampling is performed every minute or every two minutes) and may be expressed in a form of x year x month x day x hour x minute. The charging connection state includes a connected state and a disconnected state, and the network connection state includes a connected state and a disconnected state.

In practice, the operation parameters may be obtained in real time. For example, once a certain sampling time point reaches, the obtaining module 10 collects data corresponding to the sampling time point. The operation parameters may be obtained at one time. For instance, the electronic device can save data generated during the historical period to a local database in advance (e.g., data in association with each switch between a screen-on state and a screen-off state in the historical period, data in association with a change of a charing state in the historical period, data in association with a change of a network state in the historical period, and data in association with each initiating of an application in the historical period). Then the obtaining module 10 extracts the operation parameters corresponding to respective sampling time points in the historical period at one time according to a sampling frequency.

(2) The determining module 20: for each of the sampling time points in the historical period, the determining module 20 is configured to determine, according to the sampling time point, an attenuation parameter corresponding to the operation parameter.

In some embodiments, the determining module 20 is configured to: extract a sampling date from the sampling time point; determine a distribution position of the sampling date from all distribution positions of the historical period; and obtain, according to the distribution position, the attenuation parameter corresponding to the operation parameter.

In the embodiment, attenuation parameters corresponding to different distribution positions can be set in advance. Attenuation parameters and distribution positions may be in a one-to-one correspondence (i.e., attenuation parameter is attenuated once a day) or in a one-to-many correspondence (i.e., attenuation parameter is attenuated every multiple days). Considering that when a distribution position of a sampling time point is adjacent to a first distribution position of the historical period, it indicates that the sampling time point is away from a current time point, and since data collected at the sampling time point has low referenceability, a value of an attenuation parameter corresponding to the sampling time point can be set to be relatively small.

(3) The generating module 30: for each of the sampling time points in the historical period, the generating module 30 is configured to generate at least one training sample according to the sampling time point and the operation parameter.

Figure 7:
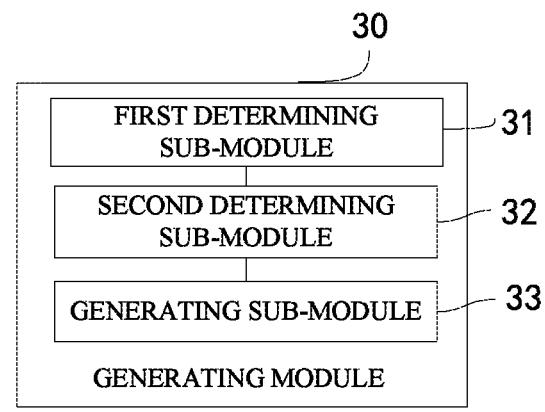
FIG. 7 is a schematic structural diagram illustrating a generating module according to embodiments.

In some embodiments, as illustrated in FIG. 7, the generating module 30 includes a first determining sub-module 31, a second determining sub-module 32, and a generating sub-module 33.

The first determining sub-module 31 is configured to determine a sampling-date type and a sampling period according to the sampling time point.

In the embodiment, the sampling-date type may be obtained by dividing each week, for example, each week is divided to weekdays and rest days. The sampling period may be obtained by dividing each day in units of hours, for example, each day is divided to be 48 periods.

The second determining sub-module 32 is configured to determine a preset electric quantity range in which the remaining electric quantity falls and determine a preset duration range in which the screen-on duration falls.

In the embodiment, the preset electric quantity range and the preset duration range may be set by the user. The preset electric quantity range may be an electric quantity range indicating high electric quantity, an electric quantity range indicating medium electric quantity, or an electric quantity range indicating low electric quantity. For instance, the electric quantity range indicating high electric quantity is a range of 70% to 100%, the electric quantity range indicating medium electric quantity is a range of 40% to 70%, and the electric quantity range indicating low electric quantity is a range of 0 to 40%. The preset duration range may be a duration range indicating short duration, a duration range indicating medium duration, or a duration range indicating long duration. For instance, the duration range indicating long duration is a range of more than 10 minutes, the duration range indicating medium duration is a range of 5 minutes to 10 minutes, and the duration range indicating short duration is a range of 0 to 5 minutes.

The generating sub-module 33 is configured to generate the at least one training sample according to the sampling-date type, the sampling period, the preset electric quantity range, the preset duration range, the foreground application, the charging connection state, and the network connection state.

Figure 8:
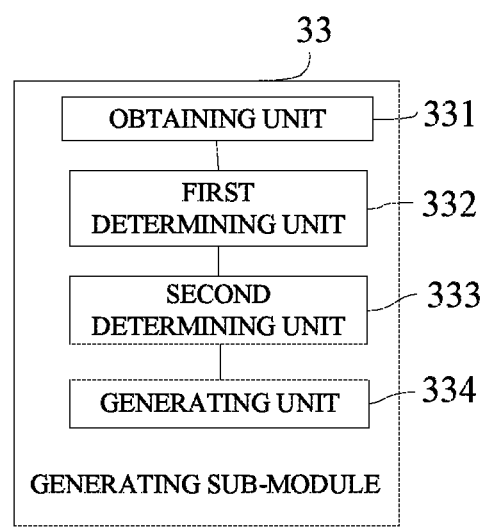
FIG. 8 is a schematic structural diagram illustrating a generating sub-module according to embodiments.

In some embodiments, as illustrated in FIG. 8, the generating sub-module 33 includes an obtaining unit 331, a first determining unit 332, a second determining unit 333, and a generating unit 334.

The obtaining unit 331 is configured to obtain at least one target prediction application.

In the embodiment, the at least one target prediction application may include all applications or some applications installed in the electronic device. In the case that the at least one target prediction application includes some applications, the applications may be several applications that have been used most frequently recently, and the number of the applications is determined according to actual needs.

The first determining unit 332 is configured to determine, according to the sampling time point, a last switched application running before the foreground application and a next switched application running after the foreground application from operation parameters obtained.

In the embodiment, a foreground application determined at any sampling time point in the historical period is known. For a foreground application determined at a sampling time point, each foreground application determined at a sampling time point earlier than the sampling time point can be considered as a last switched application running before the foreground application, and each foreground application determined at a sampling time point later than the sampling time point can be considered as a next switched application running after the foreground application. Generally, the first determining unit 332 determines a foreground application determined at a sampling time point earlier than a current sampling time point and closest to the current sampling time point than other sampling time points as the last switched application, and determines a foreground application determined at a sampling time point later than the current sampling time point and closest to the current sampling time point than other sampling time points as the next switched application. In practice, all foreground applications may be sorted according to sampling time points at which the foreground applications are determined. For any three adjacent different foreground applications among the foreground applications arranged according to the sampling time points, a foreground application ahead of a foreground application in a middle position can be determined as a last switched application running before the foreground application in the middle position, and a foreground application after the foreground application in the middle position can be determined as a next switched application running after the foreground application in the middle position.

The second determining unit 333 is configured to, for each of the at least one target prediction application, determine a prediction value for the target prediction application according to the sampling time point, the next switched application, and the foreground application.

In the embodiment, the prediction value may be a value set by the user. For example, the prediction value is 0 or 1, where the prediction value being 0 represents that the target prediction application will not be switched to the foreground in a short time, and the prediction value being 1 represents that the target prediction application will be switched to the foreground in a short time. Since all foreground applications determined at sampling time points in the historical period are known, the prediction value for the target prediction application can be determined according to the known foreground applications and sampling time points at which the known foreground applications are determined. In some embodiments, the second determining unit 333 is configured to: calculate a difference between a sampling time point at which the next switched application is determined and the sampling time point at which the foreground application is determined; determine whether the target prediction application is the next switched application and whether the difference fails to exceed preset time length; set a first preset value to be the prediction value for the target prediction application, when the target prediction application is the next switched application and the difference fails to exceed the preset time length; and set a second preset value to be the prediction value for the target prediction application, when the target prediction application is not the next switched application or the difference exceeds the preset time length.

In the embodiment, the preset time length, the first preset value, and the second preset value may be set by the user. The preset time length is time length. The preset time length corresponds to 10 minutes for example. The first preset value is 1 and the second preset value is 0 for example. For each sampling, when the target prediction application to be predicted is the next switched application, the second determining unit 333 further determines time length required for switching from a current application to the next switched application. The second determining unit 333 sets 1 to be the prediction value for the target prediction application only when the time length is within the preset time length; otherwise, the second determining unit 333 sets 0 to be the prediction value for the target prediction application.

The generating unit 334 is configured to, for each of the at least one target prediction application, generate a training sample among the at least one training sample according to the last switched application, the foreground application, the sampling-date type, the sampling period, the preset electric quantity range, the preset duration range, the charging connection state, the network connection state, the target prediction application, and the prediction value.

In the embodiment, user behaviors are analyzed from multiple dimensions, such that a trained machine learning model is relatively personified. Each training sample may include data of multiple known feature items and a label item. The feature items may include the last switched application, the foreground application, the sampling-date type, the sampling period, the preset electric quantity range, the preset duration range, the charging connection state, the network connection state, and so on. The label item may include the the prediction value.

In some embodiments, the generating unit 334 is configured to: obtain feature values corresponding to the last switched application, the foreground application, the sampling-date type, the sampling period, the preset electric quantity range, the preset duration range, the charging connection state, the network connection state, and the target prediction application, respectively; and generate the training sample according to the feature values and the prediction value.

In the embodiment, since computer programs are generally encoded in a form of characters, the feature value is mainly expressed in a form of Arabic numbers or letters (e.g., the feature value is expressed in a form of 1-10). Each feature item is also expressed in a form of letters. For example, a feature item corresponding to the foreground application is H, a feature item corresponding to the sampling-date type is B. The generating unit 334 is configured to generate the training sample by directly using the feature values as prior conditions and a prediction value for each target prediction application as a posterior result.

It can be understood that, the feature values corresponding to the feature items can be set in advance. Feature values of different feature items may be the same or different. For example, both a feature value corresponding to the foreground application and a feature value corresponding to the sampling period can be expressed in the form of 0-10. However, for different feature items, a same number may have different meanings. For instance, for the foreground application, 0 represents a group purchase application while 0 represents a period of 0:00-1:00 for the sampling period.

(4) The training module 40: the training module 40 is configured to train a predetermined Bayesian model according to training samples generated and attenuation parameters determined.

In some embodiments, the training module 40 is configured to: obtain multiple sample groups by grouping training samples with a same attenuation parameter into one group; for each of the multiple sample groups, take the sample group and an attenuation parameter corresponding to the sample group into a first preset formula for calculation, and obtain probability for one of prediction values, where the first preset formula is:

$$P(j2) = \frac{\sum_{i=1}^{m} (\lambda^{i-1} * N_{S_i}(j2))}{\sum_{i=1}^{m} (\lambda^{i-1} * N_{S_i}(j1)) + \sum_{i=1}^{m} (\lambda^{i-1} * N_{S_i}(j2))},$$

where j1 is the first preset value, and j2 is the second preset value, the sample groups include $(S_1, S_2, \ldots, S_m)$, $1 \le i \le m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and P(j2) represents probability of an occurrence that j2 is set to be the prediction value; for each of the multiple sample groups, take the prediction values, feature values, and the attenuation parameter corresponding to the sample group into a second preset formula, and obtain probability for each feature value when the prediction value is j2, where the second preset formula is:

$$P(q_j | j2) = \frac{\sum_{i=1}^{m} (\lambda^{i-1} * N_{S_i}(q_j, j2))}{\sum_{i=1}^{m} (\lambda^{i-1} * N_{S_i}(j2))},$$

where the feature values include $(q_1, q_2, \ldots, q_n)$, $1 \leq j \leq n$, $N_{S_i}(q_j, j2)$ represents the number of training samples generated with the feature value $q_j$ and $j2$.

In the embodiment, the Bayesian model may be:

$$P(J|q_1, q_2 \ldots q_n) = \frac{P(q_1, q_2 \ldots q_n|J) \times P(J)}{P(q_1, q_2 \ldots q_n)},$$

where $q_1, q_2, \ldots, q_n$ are prior conditions, $q_n$ is a feature value corresponding to an $n^{th}$ feature item, and J is the prediction value for the target prediction application. To simplify the calculation, supposing $q_1, q_2, \ldots q_n$ are independent of each other, $$P(J|q_1, q_2 \ldots q_n) = \frac{P(q_1|J)P(q_2|J) \ldots P(q_n|J)}{P(q_1)P(q_2) \ldots P(q_n)},$$

a naive Bayes classifier model (i.e., JMAX=arg max $P(J|q_1, q_2 \ldots q_n)$=arg max$P(q_1|J)P(q_2|J) \ldots P(q_n|J)$, where J represents j1 or j2) can be obtained. Since there is a correspondence between sampling time points and attenuation parameters, feature items corresponding to a same attenuation parameter can be grouped into one sample group according to sampling time points before statistics. In this way, multiple sample groups $[s_1, s_2, s_3, \ldots s_m]$ can be obtained, and each sample group corresponds to an attenuation parameter. Then the probability for one of the prediction values is calculated with the first preset formula and the probability for one of the prediction values and one of the feature values is calculated with the second preset formula. It should be understood that, a process of training the Bayesian model is a process of probability statistics. That is, for each of the feature items, probability for a feature value corresponding to the feature item (e.g., $P(q_1)$ and $P(q_1|j2)$) can be obtained after the Bayesian model is trained.

(5) The controlling module 50: the controlling module 50 is configured to control at least one background application of the electronic device according to the trained Bayesian model.

In some embodiments, the controlling module 50 is configured to carry out following actions.

The controlling module 50 is configured to obtain a background-application cleanup instruction (3-1).

In the embodiment, the background-application cleanup instruction may be automatically generated by the electronic device. For instance, the background-application cleanup instruction is generated in the case that occupied memory reaches a certain limit, electric quantity is insufficient, or a running speed is low. The background-application cleanup instruction may also be generated in response to a user's operation. For example, the background-application cleanup instruction is generated in response to an operation of clicking a designated cleaning icon by the user.

The controlling module 50 is configured to obtain the at least one background application and a current operation parameter of the electronic device according to the background-application cleanup instruction (3-2).

The controlling module 50 is configured to, for each of the at least one background application, calculate cleanup probability for the background application with the trained Bayesian model and the current operation parameter (3-3).

In some embodiments, the controlling module 50 is configured to: determine current feature values according to the current operation parameter; and take the current feature values into a third preset formula for calculation, and obtain the cleanup probability for the background application, where the third preset formula is: $P_{cleanup} = P(j2) \prod_{k=1}^{n} P(q_k|j2)$, where $1 \leq k \leq n$, and $q_k$ is one of the current feature values.

In the embodiment, similar to a training process, a current sampling-date type, a current sampling period, a current preset electric quantity range, a current preset duration range, a last switched application running before the current foreground application, a current foreground application, a current charging connection state, a current network connection state, and a background application to be predicted (i.e., nine feature items, and n is 9,) can be obtained according to the current operation parameter, and then feature values $q_1, q_2 \ldots q_9$ corresponding to the nine feature items can be obtained. Probability for j2 in the case that the current feature values exist (i.e., the probability that the current background application that needs to be predicted will not be switched to the foreground in a short time) can be calculated with a formula: $P(j2|q_1, q_2 \ldots q_9) = P(j2) P(q_1|j2)P(q_2|j2) \ldots P(q_9|j2)$, and the probability for j2 in the case that the current feature values exist is used as the cleanup probability, where $P(q_k|j2)$ has been calculated at block 104 and can be directly obtained.

The controlling module 50 is configured to determine at least one to-be-closed background application from the at least one background application according to the cleanup probability for each of the at least one background application, and close the at least one to-be-closed background application (3-4).

In some embodiments, the at least one background application is embodied as a plurality of background applications, and the controlling module 50 is configured to: select at least one background application each having cleanup probability greater than or equal to a preset threshold from the plurality of background applications as the at least one to-be-closed background application, or select a preset number background applications each with the highest cleanup probability from the plurality of background applications as the at least one to-be-closed background application; and close the at least one to-be-closed background application.

In the embodiment, the preset threshold is 0.9 and the preset number is 4 for example, a background application to be predicted is considered not to be switched to the foreground in a short time when $P(j2|q_1, q_2 \ldots q_n)$ calculated is greater than 0.9. In this case, the background application to be predicted is selected as a cleanable object and cleaned up.

In specific implementation, the foregoing units (modules or sub-modules) may be implemented as independent entities, or may also be implemented in any combination to be implemented as one or several entities. For details of specific configurations of the foregoing units (modules or sub-modules), reference may be made to the related descriptions in the foregoing method embodiments, and it will not be repeated herein.

According to the device for controlling an application of embodiments which is applicable to the electronic device, the obtaining module 10 is configured to, for each of the sampling time points in the historical period, obtain the operation parameter of the electronic device corresponding to the sampling time point (where the operation parameter includes a foreground application, remaining electric quantity, screen-on duration, a charging connection state, and a network connection state). The determining module 20 is configured to, for each of the sampling time points in the historical period, determine, according to the sampling time point, the attenuation parameter corresponding to the operation parameter. The generating module 30 is configured to, for each of the sampling time points in the historical period, generate the at least one training sample according to the sampling time point and the operation parameter. The training module 40 is configured to train the predetermined Bayesian model according to the training samples generated and the attenuation parameters determined. The controlling module 50 is configured to control at least one background application of the electronic device according to the trained Bayesian model. In this way, the at least one background application to be cleaned up can be relatively accurately selected according to historical usage information of applications. Furthermore, the method is simple and flexible, which saves system resources and has a good user experience.

Figure 9:
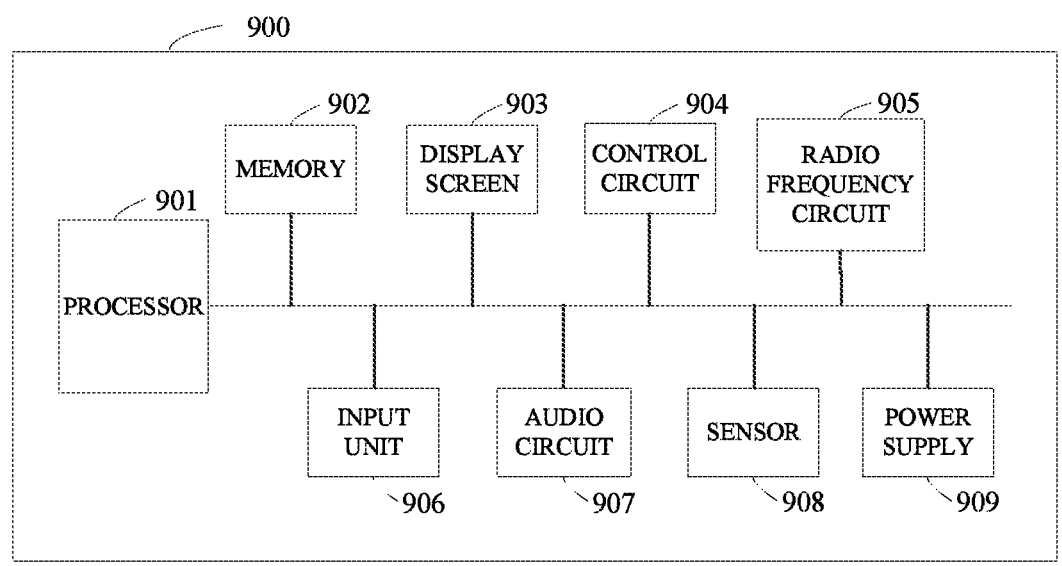
FIG. 9 is a schematic structural diagram illustrating an electronic device according to embodiments.

In addition, an electronic device is further provided according to embodiments of the disclosure. The electronic device may be a device such as a smart phone, a tablet computer, or the like. As illustrated in FIG. 9, an electronic device 900 includes a processor 901, a memory 902, a display screen 903, and a control circuit 904. The processor 901 is electrically coupled with the memory 902, the display screen 903, and the control circuit 904, respectively.

The processor 901 is a control center of the electronic device 900. The processor 901 is configured to connect various parts of the entire electronic device through various interfaces and lines. The processor 901 is configured to execute various functions of the electronic device and process data by running or loading programs stored in the memory 902 and invoking data stored in the memory 902, thereby monitoring the entire electronic device.

In this embodiment, the processor 901 of the electronic device 900 is configured to load instructions corresponding to processes of one or more programs into the memory 902 according to the following operations, and to run programs stored in the memory 902, thereby implementing various functions. For each of sampling time points in a historical period, an operation parameter of the electronic device corresponding to the sampling time point is obtained, where the operation parameter includes a foreground application, remaining electric quantity, screen-on duration, a charging connection state, and a network connection state. For each of the sampling time points in the historical period, an attenuation parameter corresponding to the operation parameter is determined according to the sampling time point. For each of the sampling time points in the historical period, at least one training sample is generated according to the sampling time point and the operation parameter. A predetermined Bayesian model is trained according to training samples generated and attenuation parameters determined. At least one background application of the electronic device is controlled according to the trained Bayesian model.

In some embodiments, the instructions operable with the processor to, for each of the sampling time points in the historical period, determine, according to the sampling time point, the attenuation parameter corresponding to the operation parameter are operable with the processor to: extract a sampling date from the sampling time point; determine a distribution position of the sampling date from all distribution positions of the historical period; and obtain, according to the distribution position, the attenuation parameter corresponding to the operation parameter.

In some embodiments, the instructions operable with the processor to, for each of the sampling time points in the historical period, generate the at least one training sample according to the sampling time point and the operation parameter are operable with the processor to: determine a sampling-date type and a sampling period according to the sampling time point; determine a preset electric quantity range in which the remaining electric quantity falls and determine a preset duration range in which the screen-on duration falls; and generate the at least one training sample according to the sampling-date type, the sampling period, the preset electric quantity range, the preset duration range, the foreground application, the charging connection state, and the network connection state.

In some embodiments, the instructions operable with the processor to generate the at least one training sample according to the sampling-date type, the sampling period, the preset electric quantity range, the preset duration range, the foreground application, the charging connection state, and the network connection state are operable with the processor to: obtain at least one target prediction application; determine, according to the sampling time point, a last switched application running before the foreground application and a next switched application running after the foreground application from operation parameters obtained; for each of the at least one target prediction application, determine a prediction value for the target prediction application according to the sampling time point, the next switched application, and the foreground application; and for each of the at least one target prediction application, generate a training sample among the at least one training sample according to the last switched application, the foreground application, the sampling-date type, the sampling period, the preset electric quantity range, the preset duration range, the charging connection state, the network connection state, the target prediction application, and the prediction value.

In some embodiments, the instructions operable with the processor to, for each of the at least one target prediction application, determine the prediction value for the target prediction application according to the sampling time point, the next switched application, and the foreground application are operable with the processor to: calculate a difference between a sampling time point at which the next switched application is determined and the sampling time point at which the foreground application is determined; determine whether the target prediction application is the next switched application and whether the difference fails to exceed preset time length; set a first preset value to be the prediction value for the target prediction application, upon determining that the target prediction application is the next switched application and the difference fails to exceed the preset time length; and set a second preset value to be the prediction value for the target prediction application, upon determining that the target prediction application is not the next switched application or the difference exceeds the preset time length.

In some embodiments, the instructions operable with the processor to, for each of the at least one target prediction application, generate the training sample among the at least one training sample according to the last switched application, the foreground application, the sampling-date type, the sampling period, the preset electric quantity range, the preset duration range, the charging connection state, the network connection state, the target prediction application, and the prediction value are operable with the processor to: obtain feature values corresponding to the last switched application, the foreground application, the sampling-date type, the sampling period, the preset electric quantity range, the preset duration range, the charging connection state, the network connection state, and the target prediction application, respectively; and generate the training sample according to the feature values and the prediction value.

In some embodiments, the instructions operable with the processor to train the predetermined Bayesian model according to the training samples generated and the attenuation parameters determined are operable with the processor to: obtain multiple sample groups by grouping training samples with a same attenuation parameter into one group; for each of the multiple sample groups, take the sample group and an attenuation parameter corresponding to the sample group into a first preset formula for calculation, and obtain probability for one of prediction values, where the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

where j1 is the first preset value, and j2 is the second preset value, the sample groups include $(S_1, S_2, \ldots, S_m)$, $1 \leq i \leq m$, $\lambda^{i-1}$ is an attenuation parameter corresponding to a sample group $S_i$, $0 < \lambda < 1$, $N_{S_i}(j1)$ represents the number of training samples generated with j1 in a sample group $S_i$, $N_{S_i}(j2)$ represents the number of training samples generated with j2 in a sample group $S_i$, and P(j2) represents probability of an occurrence that j2 is set to be the prediction value; and for each of the multiple sample groups, take the prediction values, feature values, and the attenuation parameter corresponding to the sample group into a second preset formula, and obtain probability for each feature value when the prediction value is j2, where the second preset formula is:

$$P(q_j|j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

where the feature values include $(q_1, q_2, \ldots, q_n)$, $1 \leq j \leq n$, $N_{S_i}(q_j, j2)$ represents the number of training samples generated with the feature value $q_j$ and j2.

In some embodiments, the instructions operable with the processor to control the at least one background application of the electronic device according to the trained Bayesian model are operable with the processor to: obtain a background-application cleanup instruction; obtain the at least one background application and a current operation parameter of the electronic device according to the background-application cleanup instruction; for each of the at least one background application, calculate cleanup probability for the background application with the trained Bayesian model and the current operation parameter; and determine at least one to-be-closed background application from the at least one background application according to the cleanup probability for each of the at least one background application and close the at least one to-be-closed background application.

In some embodiments, the instructions operable with the processor to, for each of the at least one background application, calculate the cleanup probability for the background application with the trained Bayesian model and the current operation parameter are operable with the processor to: determine current feature values according to the current operation parameter; and take the current feature values into a third preset formula for calculation, and obtain the cleanup probability for the background application, where the third preset formula is: $P_{cleanup} = P(j2) \, \Pi_{k=1}^{n} P(q_k|j2)$, where $1 \leq k \leq n$, and $q_k$ is one of the current feature values.

In some embodiments, the at least one background application is embodied as a plurality of background applications, the instructions operable with the processor to determine the at least one to-be-closed background application from the at least one background application according to the cleanup probability for each of the at least one background application and close the at least one to-be-closed background application are operable with the processor to: select at least one background application each having cleanup probability greater than or equal to a preset threshold from the plurality of background applications as the at least one to-be-closed background application, or select a preset number background applications each with the highest cleanup probability from the plurality of background applications as the at least one to-be-closed background application; and close the at least one to-be-closed background application.

The memory 902 is configured to store programs and data. The programs stored in the memory 902 include instructions that are executable in the processor. The programs can form various functional modules. The processor 901 executes various functional applications and data processing by running the programs stored in the memory 902.

The display screen 903 is configured to display information entered by a user or information provided for the user as well as various graphical user interfaces of the terminal. These graphical user interfaces may be composed of images, text, icons, videos, and any combination thereof.

The control circuit 904 is electrically coupled with the display screen 903 and is configured to control the display screen 903 to display information.

In some embodiments, as illustrated in FIG. 9, the electronic device 900 further includes a radio frequency circuit 905, an input unit 906, an audio circuit 907, a sensor 908, and a power supply 909. The processor 901 is electrically coupled with the radio frequency circuit 905, the input unit 906, the audio circuit 907, the sensor 908, and the power supply 909, respectively.

The radio frequency circuit 905 is configured to transmit and receive (i.e., transceive) radio frequency signals, establish a wireless communication connection with a network device or other electronic devices through wireless communication, and transmit and receive signals with the network device or other electronic devices.

The input unit 906 is configured to receive inputted numbers, character information, or user feature information (e.g., fingerprints), and to generate keyboard-based, mouse-based, joystick-based, optical, or trackball signal inputs, and other signal inputs related to user settings and function control. The input unit 906 may include a fingerprint recognition module.

The audio circuit 907 is configured to provide an audio interface between a user and the terminal through a speaker or a microphone.

The electronic device 900 may further include at least one sensor 908, such as a light sensor, a motion sensor, and other sensors. In one implementation, the light sensor includes an ambient light sensor and a proximity sensor. The ambient light sensor may adjust the brightness of the display panel according to the brightness of ambient lights. The proximity sensor may turn off the display panel and/or backlight when the terminal reaches nearby the ear. As a kind of motion sensor, a gravity acceleration sensor can detect the magnitude of acceleration in all directions (typically three axes), and can detect the magnitude and direction of gravity when the terminal is stationary. The accelerometer sensor can also used to identify mobile-phone gestures related applications (such as vertical and horizontal screen switch, related games, magnetometer attitude calibration), and vibration-recognition related functions (such as a pedometer, percussion) and so on. The terminal may also be provided with other sensors such as a gyroscope, a barometer, a hygrometer, a thermometer, and an infrared sensor, and the like, and it will not be repeated herein.

The power supply 909 is configured for power supply of various components of the electronic device 900. In some embodiments, the power supply 909 may be logically coupled with the processor 901 via a power management system to enable management of charging, discharging, and power consumption through the power management system.

Although not illustrated in FIG. 9, the electronic device 900 may further include a camera, a Bluetooth module, and the like, and the disclosure will not elaborate herein.

Those of ordinary skill in the art may understand that implementing all or part of the operations in the foregoing method embodiments may be accomplished through programs or through programs to instruct the relevant hardware to complete, and the programs may be stored in a computer readable storage medium and loaded and executed by a processor. According to embodiments, a non-transitory computer-readable storage medium is provided. The storage medium stores multiple instructions. The instructions, when executed by a processor, are operable with the processor to execute operations of any of the methods for controlling an application of embodiments.

The storage medium may include a read-only memory (ROM), a random access memory (RAM), a magnetic disk or an optical disk, and the like.

The instructions stored in the storage medium are operable to execute the operations of any of the methods for controlling an application of embodiments, therefore, the beneficial effects that can be achieved by any of the methods can be realized. For details, reference may be made to the related descriptions in the foregoing embodiments, and it will not be repeated herein.

For details of specific implementation of the foregoing operations, reference may be made to the related descriptions in the foregoing embodiments, and it will not be described in further detail herein.

While the disclosure has been described in detail above with reference to the example embodiments, the scope of the disclosure is not limited thereto. As will occur to those skilled in the art, the disclosure is susceptible to various modifications and changes without departing from the spirit and principle of the disclosure. Therefore, the scope of the disclosure should be determined by the scope of the claims.

What is claimed is:

1. A method for controlling an application, the method being applicable to an electronic device and comprising:
   for each of sampling time points in a historical period:
      obtaining an operation parameter of the electronic device corresponding to the sampling time point in the historical period, wherein the operation parameter of the electronic device comprises a foreground application, remaining elect ric quantity, screen-on duration, a charging connection state, and a network connection state;
      determining, according to the sampling time point in the historical period, an attenuation parameter corresponding to the operation parameter of the electronic device; and
      generating at least one training sample according to the sampling time point in the historical period and the operation parameter of the electronic device;
   training a predetermined Bayesian model according to training samples generated according to the sampling time points in the historical period and attenuation parameters determined corresponding to operation parameters of the electronic device; and
   controlling at least one background application of the electronic device according to the trained Bayesian model.

2. The method of claim 1, wherein for each of the sampling time points in the historical period, determining, according to the sampling time point in the historical period, the attenuation parameter corresponding to the operation parameter of the electronic device comprises:
   extracting a sampling date from the sampling time point in the historical period;
   determining a distribution position of the sampling date from all distribution positions of the historical period; and
   obtaining, according to the distribution position of the sampling date, the attenuation parameter corresponding to the operation parameter of the electronic device.

3. The method of claim 1, wherein for each of the sampling time points in the historical period, generating the at least one training sample according to the sampling time point in the historical period and the operation parameter of the electronic device comprises:
   determining a sampling-date type and a sampling period according to the sampling time point in the historical period;
   determining a preset electric quantity range in which the remaining electric quantity falls and determining a preset duration range in which the screen-on duration falls; and
   generating the at least one training sample according to the sampling-date type, the sampling period, the preset electric quantity range, the preset duration range, the foreground application, the charging connection state, and the network connection state.

4. The method of claim 3, wherein generating the at least one training sample according to the sampling-date type, the sampling period, the preset electric quantity range, the preset duration range, the foreground application, the charging connection state, and the network connection state comprises:
   determining at least one target prediction application;
   determining, according to the sampling time point in the historical period, a last switched application running before the foreground application and a next switched application running after the foreground application from operation parameters of the electronic device obtained; and
   for each of the at least one target prediction application:
      determining a prediction value for the target prediction application according to the sampling time point in the historical period, the next switched application, and the foreground application; and
      generating a training sample among the at least one training sample according to the last switched application, the foreground application, the sampling-date type, the sampling period, the preset electric quantity range, the preset duration range, the charging connection state, the network connection state, the target prediction application, and the prediction value for the target prediction application.

5. The method of claim 4, wherein for each of the at least one target prediction application, determining the prediction value for the target prediction application according to the sampling time point in the historical period, the next switched application, and the foreground application comprises:

calculating a difference between a sampling time point in the historical period at which the next switched application is determined and a sampling time point in the historical period at which the foreground application is determined;

determining whether the target prediction application is the next switched application and whether the difference fails to exceed preset time length;

setting a first preset value to be the prediction value for the target prediction application, upon determining that the target prediction application is the next switched application and the difference fails to exceed the preset time length; and setting a second preset value to be the prediction value for the target prediction application, upon determining that the target prediction application is not the next switched application or the difference exceeds the preset time length.

6. The method of claim 5, wherein for each of the at least one target prediction application, generating the training sample among the at least one training sample according to the last switched application, the foreground application, the sampling-date type, the sampling period, the preset electric quantity range, the preset duration range, the charging connection state, the network connection state, the target prediction application, and the prediction value for the target prediction application comprises:

obtaining feature values corresponding to the last switched application, the foreground application, the sampling-date type, the sampling period, the preset electric quantity range, the preset duration range, the charging connection state, the network connection state, and the target prediction application, respectively; and generating the training sample according to the feature values and the prediction value for the target prediction application.

7. The method of claim 6, wherein training the predetermined Bayesian model according to the training samples generated according to the sampling time points in the historical period and the attenuation parameters determined corresponding to the operation parameters of the electronic device comprises:

obtaining a plurality of sample groups by grouping training samples with a same attenuation parameter into one group;

for each of the plurality of sample groups, taking the sample group and an attenuation parameter corresponding to the sample group into a first preset formula for calculation, and obtaining a probability for one of prediction values, wherein the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

wherein j1 is the first preset value, j2 is the second preset value, the plurality of sample groups comprise $(S_1, S_2, \ldots, S_m)$, $1 \le i \le m$, $\lambda^{i-1}$ is an attenuation parameter corresponding to a sample group $S_i$, $0 < \lambda < 1$, $N_{S_i}(j1)$ represents a number of training samples generated with j1 in a sample group $S_i$, $N_{S_i}(j2)$ represents a number of training samples generated with j2 in a sample group $S_i$, and P(j2) represents a probability of an occurrence that j2 is set to be the prediction value; and for each of the plurality of sample groups, taking the prediction values, feature values, and the attenuation parameter corresponding to the sample group into a second preset formula for calculation, and obtaining a probability for each feature value when the prediction value for the target prediction application is j2, wherein the second preset formula is:

$$P(q_j|j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

wherein the feature values comprise $(q_1, q_2, \ldots, q_n)$, and $1 \le j \le n$, $N_{S_i}(q_j, j2)$ represents a number of training samples generated with $q_j$ and j2.

8. The method of claim 7, wherein controlling the at least one background application of the electronic device according to the trained Bayesian model comprises:

obtaining a background-application cleanup instruction;

determining the at least one background application of the electronic device and a current operation parameter of the electronic device according to the background-application cleanup instruction;

for each of the at least one background application of the electronic device, calculating cleanup probability for the background application of the electronic device with the trained Bayesian model and the current operation parameter of the electronic device; and determining at least one to-be-closed background application from the at least one background application of the electronic device according to the cleanup probability for each of the at least one background application of the electronic device, and closing the at least one to-be-closed background application.

9. The method of claim 8, wherein for each of the at least one background application of the electronic device, calculating the cleanup probability for the background application of the electronic device with the trained Bayesian model and the current operation parameter of the electronic device comprises:

determining current feature values according to the current operation parameter of the electronic device; and taking the current feature values into a third preset formula for calculation, and obtaining the cleanup probability for the background application of the electronic device, wherein the third preset formula is:

$P_{cleanup} = P(j2) \prod_{k=1}^{n} P(q_k|j2)$, wherein $1 \le k \le n$, and $q_k$ is one of the current feature values.

10. The method of claim 8, wherein the at least one background application of the electronic device is embodied as a plurality of background applications of the electronic device, determining the at least one to-be-closed background application from the at least one background application of the electronic device according to the cleanup probability for each of the at least one background application of the electronic device and closing the at least one to-be-closed background application comprises:

selecting at least one background application of the electronic device each having cleanup probability greater than or equal to a preset threshold from the plurality of background applications of the electronic device as the at least one to-be-closed background application, or selecting a preset number of background applications each with a highest cleanup probability from the plurality of background applications of the electronic device as the at least one to-be-closed background application; and closing the at least one to-be-closed background application.

11. A non-transitory computer-readable storage medium configured to store instructions which, when executed by a processor, cause the processor to carry out actions comprising:

for each of sampling time points in a historical period:
obtaining an operation parameter of an electronic device corresponding to the sampling time point in the historical period, wherein the operation parameter of the electronic device comprises a foreground application, remaining electric quantity, screen-on duration, a charging connection state, and a network connection state;
determining, according to the sampling time point in the historical period, an attenuation parameter corresponding to the operation parameter of the electronic device; and
generating at least one training sample according to the sampling time point in the historical period and the operation parameter of the electronic device;
training a predetermined Bayesian model according to training samples generated according to the sampling time points in the historical period and attenuation parameters determined corresponding to operation parameters of the electronic device; and
controlling at least one background application of the electronic device according to the trained Bayesian model.

12. An electronic device, comprising:
at least one processor; and
a non-transitory computer-readable storage medium coupled to the at least one processor and storing at least one computer executable instruction thereon which, when executed by the at least one processor, is operable with the at least one processor to:
for each of sampling time points in a historical period:
obtain an operation parameter of the electronic device corresponding to the sampling time point in the historical period, wherein the operation parameter of the electronic device comprises a foreground application, remaining electric quantity, screen-on duration, a charging connection state, and a network connection state;
determine, according to the sampling time point in the historical period, an attenuation parameter corresponding to the operation parameter of the electronic device; and
generate at least one training sample according to the sampling time point in the historical period and the operation parameter of the electronic device;
train a predetermined Bayesian model according to training samples generated according to the sampling time points in the historical period and attenuation parameters determined corresponding to operation parameters of the electronic device; and
control at least one background application of the electronic device according to the trained Bayesian model.

13. The electronic device of claim 12, wherein the at least one computer executable instruction operable with the at least one processor to determine, for each of the sampling time points in the historical period, according to the sampling time point in the historical period, the attenuation parameter corresponding to the operation parameter of the electronic device comprises:
extract a sampling date from the sampling time point in the historical period;
determine a distribution position of the sampling date from all distribution positions of the historical period; and
obtain, according to the distribution position of the sampling date, the attenuation parameter corresponding to the operation parameter of the electronic device.

14. The electronic device of claim 12, wherein the at least one computer executable instruction operable with the at least one processor to generate, for each of the sampling time points in the historical period, the at least one training sample according to the sampling time point in the historical period and the operation parameter of the electronic device comprises:
determine a sampling-date type and a sampling period according to the sampling time point in the historical period;
determine a preset electric quantity range in which the remaining electric quantity falls and determine a preset duration range in which the screen-on duration falls; and generate the at least one training sample according to the sampling-date type, the sampling period, the preset electric quantity range, the preset duration range, the foreground application, the charging connection state, and the network connection state.

15. The electronic device of claim 14, wherein the at least one computer executable instruction operable with the at least one processor to generate the at least one training sample according to the sampling-date type, the sampling period, the preset electric quantity range, the preset duration range, the foreground application, the charging connection state, and the network connection state comprises:
determine at least one target prediction application;
determine, according to the sampling time point in the historical period, a last switched application running before the foreground application and a next switched application running after the foreground application from operation parameters of the electronic device obtained; and
for each of the at least one target prediction application:
determine a prediction value for the target prediction application according to the sampling time point in the historical period, the next switched application, and the foreground application; and
generate a training sample among the at least one training sample according to the last switched application, the foreground application, the sampling-date type, the sampling period, the preset electric quantity range, the preset duration range, the charging connection state, the network connection state, the target prediction application, and the prediction value for the target prediction application.

16. The electronic device of claim 15, wherein the at least one computer executable instruction operable with the at least one processor to determine, for each of the at least one target prediction application, the prediction value for the target prediction application according to the sampling time point in the historical period, the next switched application, and the foreground application comprises:

calculate a difference between a sampling time point in the historical period at which the next switched application is determined and a sampling time point in the historical period at which the foreground application is determined;

determine whether the target prediction application is the next switched application and whether the difference fails to exceed preset time length;

set a first preset value to be the prediction value for the target prediction application, upon determining that the target prediction application is the next switched application and the difference fails to exceed the preset time length; and set a second preset value to be the prediction value for the target prediction application, upon determining that the target prediction application is not the next switched application or the difference exceeds the preset time length.

17. The electronic device of claim 16, wherein the at least one computer executable instruction operable with the at least one processor to generate, for each of the at least one target prediction application, the training sample among the at least one training sample according to the last switched application, the foreground application, the sampling-date type, the sampling period, the preset electric quantity range, the preset duration range, the charging connection state, the network connection state, the target prediction application, and the prediction value for the target prediction application comprises:

obtain feature values corresponding to the last switched application, the foreground application, the sampling-date type, the sampling period, the preset electric quantity range, the preset duration range, the charging connection state, the network connection state, and the target prediction application, respectively; and generate the training sample according to the feature values and the prediction value for the target prediction application.

18. The electronic device of claim 17, wherein the at least one computer executable instruction operable with the at least one processor to train the predetermined Bayesian model according to the training samples generated according to the sampling time points in the historical period and the attenuation parameters determined corresponding to the operation parameters of the electronic device comprises:

obtain a plurality of sample groups by grouping training samples with a same attenuation parameter into one group;

for each of the plurality of sample groups, take the sample group and an attenuation parameter corresponding to the sample group into a first preset formula for calculation, and obtain a probability for one of prediction values, wherein the first preset formula is:

$$P(j2) = \frac{\sum_{i=1}^{m}(\lambda^{i-1} * N_{S_i}(j2))}{\sum_{i=1}^{m}(\lambda^{i-1} * N_{S_i}(j1)) + \sum_{i=1}^{m}(\lambda^{i-1} * N_{S_i}(j2))},$$

wherein j1 is the first preset value, j2 is the second preset value, the plurality of sample groups comprise ($S_1$, $S_2$, ..., $S_m$), $1 \le i \le m$, $\lambda^{i-1}$ is an attenuation parameter corresponding to a sample group $S_i$, $0<\lambda<1$, $N_{S_i}(j1)$ represents a number of training samples generated with j1 in a sample group $S_i$, $N_{S_i}(j2)$ represents a number of training samples generated with j2 in a sample group $S_i$, and P(j2) represents a probability of an occurrence that j2 is set to be the prediction value; and for each of the plurality of sample groups, take the prediction values, feature values, and the attenuation parameter corresponding to the sample group into a second preset formula for calculation, and obtain a probability for each feature value when the prediction value for the target prediction application is j2, wherein the second preset formula is:

$$P(q_j|j2) = \frac{\sum_{i=1}^{m}(\lambda^{i-1} * N_{S_i}(q_j, j2))}{\sum_{i=1}^{m}(\lambda^{i-1} * N_{S_i}(j2))},$$

wherein the feature values comprise ($q_1$, $q_2$, ..., $q_n$), and $1 \le j \le n$, $N_{S_i}(q_j, j2)$ represents a number of training samples generated with feature $q_j$ and j2.

19. The electronic device of claim 18, wherein the at least one computer executable instruction operable with the at least one processor to control the at least one background application of the electronic device according to the trained Bayesian model comprises:

obtain a background-application cleanup instruction; determine the at least one background application of the electronic device and a current operation parameter of the electronic device according to the background-application cleanup instruction;

for each of the at least one background application of the electronic device, calculate cleanup probability for the background application of the electronic device with the trained Bayesian model and the current operation parameter of the electronic device; and determine at least one to-be-closed background application from the at least one background application of the electronic device according to the cleanup probability for each of the at least one background application of the electronic device, and close the at least one to-be-closed background application.

20. The electronic device of claim 18, wherein the at least one computer executable instruction operable with the at least one processor to calculate, for each of the at least one background application of the electronic device, the cleanup probability for the background application of the electronic device with the trained Bayesian model and the current operation parameter of the electronic device comprises:

determine current feature values according to the current operation parameter of the electronic device; and take the current feature values into a third preset formula for calculation, and obtain the cleanup probability for the background application of the electronic device, wherein the third preset formula is:

$P_{cleanup} = P(j2) \prod_{k=1}^{n} P(q_k|j2)$, wherein $1 \le k \le n$, and $q_k$ is one of the current feature values.

* * * * *